US 9,225,478 B2

(12) United States Patent
Chen et al.

(10) Patent No.: US 9,225,478 B2
(45) Date of Patent: Dec. 29, 2015

(54) SUPPORTING MEASURMENTS AND FEEDBACK FOR 3D MIMO WITH DATA TRANSMISSION OPTIMIZATION

(71) Applicants:Xiaogang Chen, Beijing (CN); Alexei Davydov, Nizhny Novgorod (RU); Qinghua Li, San Ramon, CA (US); Yuan Zhu, Beijing (CN); Gregory V. Morozov, Nizhny Novgorod (RU); Jong-Kae Fwu, Sunnyvale, CA (US); Seunghee Han, Kyoungkido (KR); Huaning Niu, Milpitas, CA (US); Rongzhen Yang, Shanghai (CN)

(72) Inventors: Xiaogang Chen, Beijing (CN); Alexei Davydov, Nizhny Novgorod (RU); Qinghua Li, San Ramon, CA (US); Yuan Zhu, Beijing (CN); Gregory V. Morozov, Nizhny Novgorod (RU); Jong-Kae Fwu, Sunnyvale, CA (US); Seunghee Han, Kyoungkido (KR); Huaning Niu, Milpitas, CA (US); Rongzhen Yang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 174 days.

(21) Appl. No.: 13/728,778

(22) Filed: Dec. 27, 2012

(65) Prior Publication Data
US 2014/0003240 A1     Jan. 2, 2014

Related U.S. Application Data

(60) Provisional application No. 61/667,325, filed on Jul. 2, 2012.

(51) Int. Cl.
*H04W 4/00* (2009.01)
*H04L 1/18* (2006.01)
(Continued)

(52) U.S. Cl.
CPC ............ *H04L 1/1861* (2013.01); *H04L 1/1812* (2013.01); *H04L 5/0053* (2013.01);
(Continued)

(58) Field of Classification Search
USPC ................. 370/235–253, 255–252, 328–345; 375/267–295; 455/450–562, 423–446; 342/373–379
See application file for complete search history.

(56) References Cited

U.S. PATENT DOCUMENTS 7,088,997 B1 *   8/2006   Boehmke ...................... 455/423
8,619,904 B2 *   12/2013   Hammarwall et al. ....... 375/296
(Continued)

FOREIGN PATENT DOCUMENTS

WO     2014/008072 A1     1/2014

OTHER PUBLICATIONS

Bell et al., "Considerations on CSI feedback enhancements for high-priority antenna configurations", R1-112420, 3GPP TSG-RAN WG1 #66, Athens, Greece, Aug. 22-26, 2011, 7 pages.
(Continued)

*Primary Examiner* — Man Phan
(74) *Attorney, Agent, or Firm* — Thorpe North & Western

(57) ABSTRACT

Technology is discussed for supporting wireless communication paths from an antenna array with a vertical directional component. Examples reduce training feedback for increased numbers of communication paths by only reporting on a subset of Reference Signals (RSs) provided for various vertical beam configurations. Additional examples reduce feedback with virtual measurements based on a difference between RS measurements. One such measurement can come from full set of RSs for a reference beam configuration and another from a partial set of RSs for an additional beam configuration. Such virtual measurements can also be based on cross correlation for beamforming weights associated with the two configurations. Several examples of preparing and sending measurement reports consistent with Third Generation Partnership Project (3GPP) Long Term Evolution (LTE) standards are discussed. The supporting technology also increases diversity and reduces a power differential between spatially multiplexed layers transmitting a common codeword.

29 Claims, 12 Drawing Sheets

(51) Int. Cl.
*H04W 28/08* (2009.01)
*H04W 24/10* (2009.01)
*H04W 72/04* (2009.01)
*H04W 52/02* (2009.01)
*H04W 72/00* (2009.01)
*H04W 92/02* (2009.01)
*H04L 5/00* (2006.01)
*H04W 36/22* (2009.01)
*H04L 5/14* (2006.01)
*H04W 48/12* (2009.01)
*H04W 68/00* (2009.01)
*H04W 88/08* (2009.01)

(52) U.S. Cl.
CPC ............ *H04L5/0055* (2013.01); *H04L 5/0073* (2013.01); *H04L 5/14* (2013.01); *H04W 4/005* (2013.01); *H04W 24/10* (2013.01); *H04W 28/08* (2013.01); *H04W 36/22* (2013.01); *H04W 48/12* (2013.01); *H04W 52/0206* (2013.01); *H04W 52/0212* (2013.01); *H04W 52/0245* (2013.01); *H04W 68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04W 88/08* (2013.01); *Y02B 60/50* (2013.01); *Y02E 40/62* (2013.01)

(56) References Cited

U.S. PATENT DOCUMENTS

| | | | | |
|---|---|---|---|---|
| 8,675,587 B2 * | 3/2014 | Puthenpura et al. | .......... | 370/329 |
| 8,675,589 B2 * | 3/2014 | Ko et al. | .......... | 370/329 |
| 8,675,762 B2 * | 3/2014 | Cheng et al. | .......... | 375/267 |
| 8,767,581 B2 * | 7/2014 | Yamada | .......... | 370/252 |
| 8,897,780 B2 * | 11/2014 | Lindoff et al. | .......... | 455/436 |
| 8,913,682 B2 * | 12/2014 | Nam et al. | .......... | 375/267 |
| 8,928,528 B2 * | 1/2015 | Harel et al. | .......... | 342/373 |
| 2005/0272472 A1 * | 12/2005 | Goldberg et al. | .......... | 455/562.1 |
| 2010/0238824 A1 | 9/2010 | Farajidana et al. | | |
| 2010/0310001 A1 | 12/2010 | Yeh et al. | | |
| 2011/0085587 A1 * | 4/2011 | Moulsley et al. | .......... | 375/219 |
| 2011/0103504 A1 | 5/2011 | Ma | | |
| 2011/0199992 A1 * | 8/2011 | Barker et al. | .......... | 370/329 |
| 2011/0274188 A1 | 11/2011 | Sayana et al. | | |
| 2012/0188976 A1 * | 7/2012 | Kim et al. | .......... | 370/329 |
| 2012/0282935 A1 * | 11/2012 | Koivisto et al. | .......... | 455/450 |
| 2013/0116011 A1 * | 5/2013 | Lee et al. | .......... | 455/562.1 |
| 2013/0265899 A1 * | 10/2013 | Sayana et al. | .......... | 370/252 |
| 2013/0308714 A1 * | 11/2013 | Xu et al. | .......... | 375/267 |
| 2013/0315337 A1 * | 11/2013 | Dai et al. | .......... | 375/267 |
| 2014/0003240 A1 * | 1/2014 | Chen et al. | .......... | 370/235 |

OTHER PUBLICATIONS

Alcatel-Lucent, "Deployment Scenarios and Assumptions", R4-123072, 3GPP TSG RAN WG4 Meeting #63, Prague, Czech Republic, May 21-25, 2012, 3 pages.

ZTE, "Considerations of system coexistence simulation for AAS", R4-115575, 3GPP TSG RAN WG4 Meeting #61, San Francisco, USA, Nov. 14-18, 2011, 5 pages.

International Search Report and Written Opinion received for PCT Patent Application No. PCT/US2013/048001, mailed on Oct. 15, 2013, 13 pages.

* cited by examiner

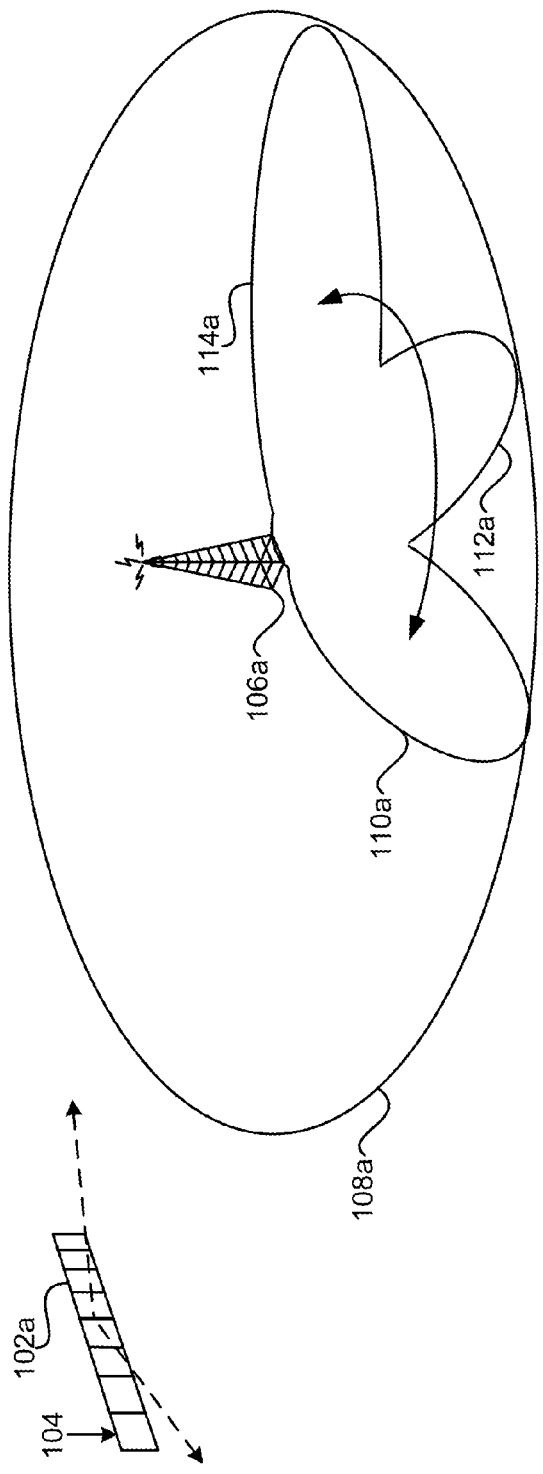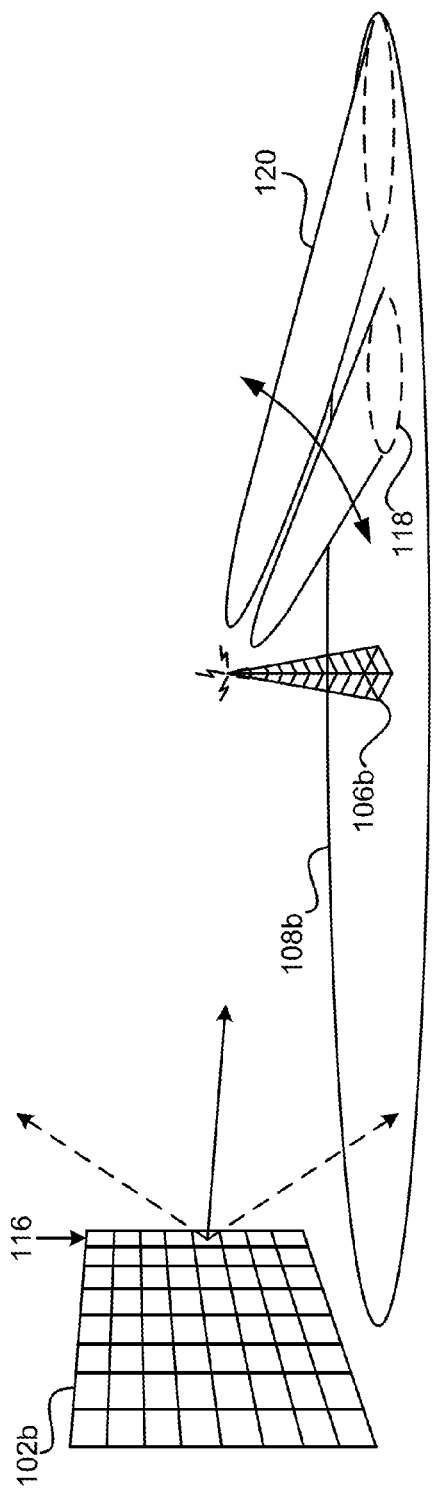
FIG. 1A
FIG. 1B

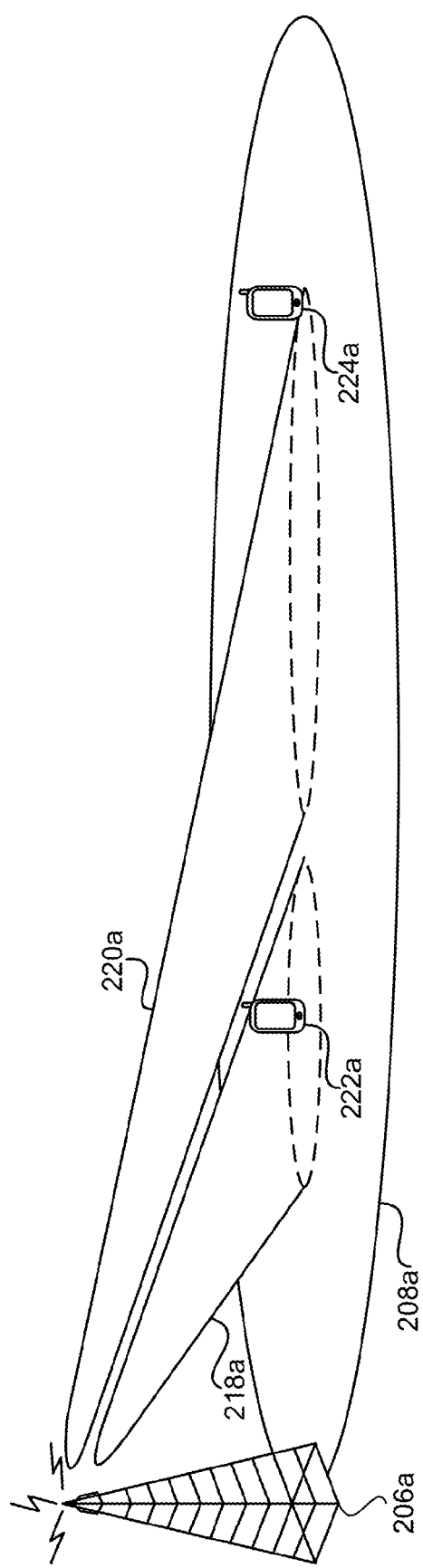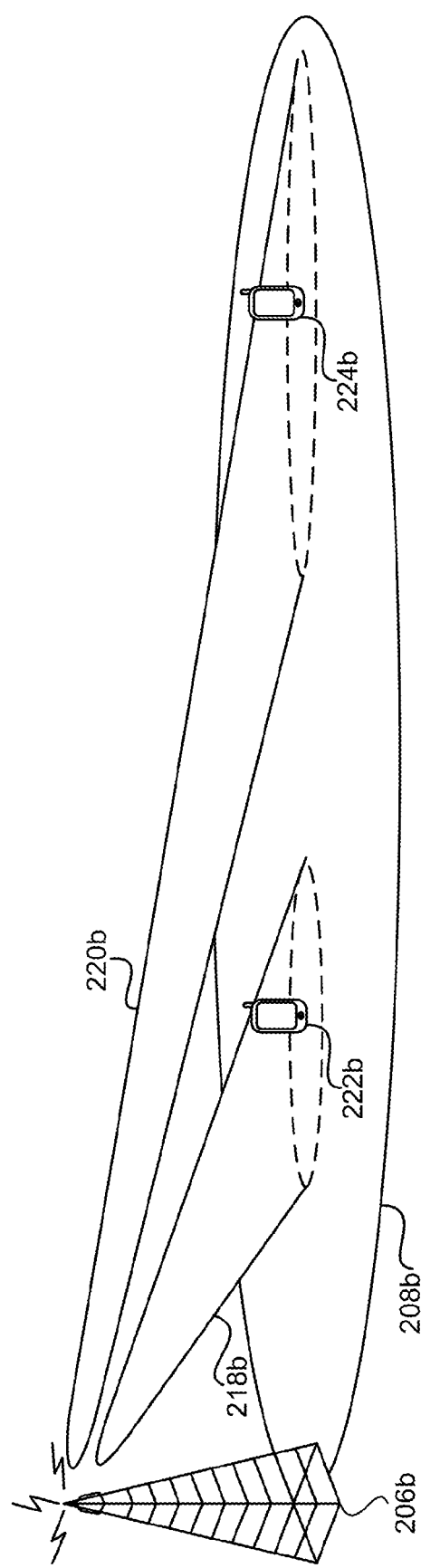

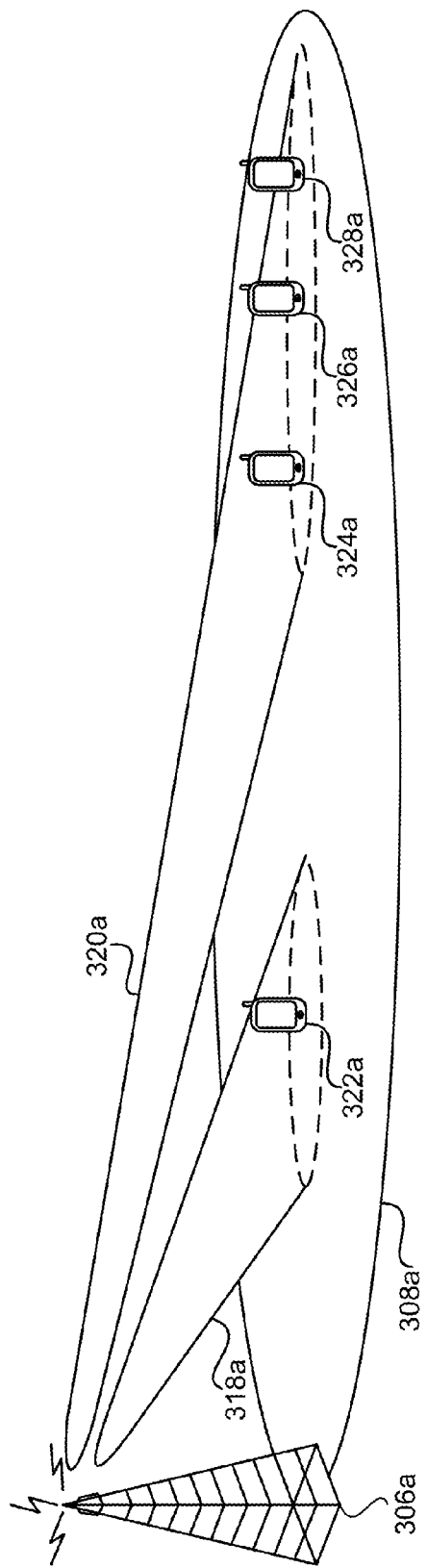
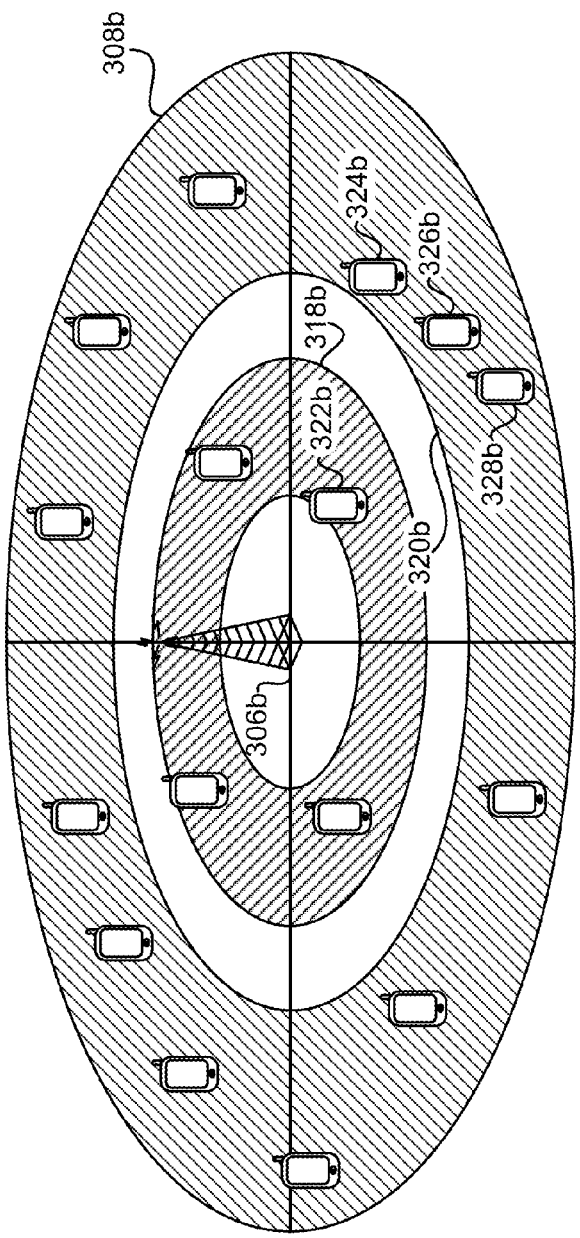
FIG. 3A
FIG. 3B $$\begin{bmatrix} y^{(0)}(i) \\ \vdots \\ y^{(P-1)}(i) \end{bmatrix} = W(i_{RB}) D(i) U \begin{bmatrix} x^{(0)}(i) \\ \vdots \\ x^{(P-1)}(i) \end{bmatrix}$$

Equation #5

$$D(i) = \begin{bmatrix} 1 & 0 & \cdots & 0 & 0 \\ 0 & e^{-j\pi i} & \cdots & 0 & 0 \\ \vdots & \vdots & \ddots & \vdots & \vdots \\ 0 & 0 & \cdots & 1 & 0 \\ 0 & 0 & \cdots & 0 & e^{-j\pi i} \end{bmatrix}$$

Equation #6

$$U = \frac{1}{\sqrt{2}} \begin{bmatrix} 1 & 1 & \cdots & 0 & 0 \\ 1 & e^{-j\pi i} & \cdots & 0 & 0 \\ \vdots & \vdots & \ddots & \vdots & \vdots \\ 0 & 0 & \cdots & 1 & 1 \\ 0 & 0 & \cdots & 1 & e^{-j\pi i} \end{bmatrix}$$

Equation #7

$$\begin{bmatrix} y^{(0)}(i) \\ \vdots \\ y^{(P-1)}(i) \end{bmatrix} = W(i_{RB}) \begin{bmatrix} r^{(0)}(i) \\ \vdots \\ r^{(P-1)}(i) \end{bmatrix}$$

Equation #8

FIG. 8B $$\begin{bmatrix} y^{(0)}(i) \\ y^{(1)}(i) \\ y^{(2)}(i) \end{bmatrix} = W(i_{RB}) D(i) U \begin{bmatrix} x^{(0)}(i) \\ x^{(1)}(i) \\ x^{(2)}(i) \end{bmatrix}$$

Equation #1

$$D(i) = \begin{bmatrix} 1 & 0 & 0 \\ 0 & 1 & 0 \\ 0 & 0 & e^{-j\pi i} \end{bmatrix}$$

Equation #2

$$U = \begin{bmatrix} 1 & 0 & 0 \\ 0 & \frac{1}{\sqrt{2}} & \frac{1}{\sqrt{2}} \\ 0 & \frac{1}{\sqrt{2}} & \frac{e^{-j\pi}}{\sqrt{2}} \end{bmatrix}$$

Equation #3

$$\begin{bmatrix} y^{(0)}(i) \\ y^{(1)}(i) \\ y^{(2)}(i) \end{bmatrix} = W(i_{RB}) \begin{bmatrix} r^{(0)}(i) \\ r^{(1)}(i) \\ r^{(2)}(i) \end{bmatrix}$$

Equation #4

FIG. 8A

SUPPORTING MEASUREMENTS AND FEEDBACK FOR 3D MIMO WITH DATA TRANSMISSION OPTIMIZATION

RELATED APPLICATIONS

This application claims the benefit of and hereby incorporates by reference U.S. Provisional patent application Ser. No. 61/667,325, filed Jul. 2, 2012.

BACKGROUND

Data load and throughput requirements placed on Wireless Wide Area Networks (WWANs) continue to increase. Some reasons for these increases include the ubiquitous use of cell phone technologies and the accelerated adoption of smart phones and tablets, with the data- and throughput-intensive services, such as streaming video, which these devices offer. Various multiple antenna techniques can be employed in WWAN environments to meet these increasing data and throughput demands with improved spectral efficiency.

For example, multiple antenna techniques can be used to achieve advantages such as diversity gain, array gain, and spatial multiplexing gain. Although some of these advantages have been realized by the implementation of multiple antenna techniques in wireless communication standards, large gains, indicated by the theoretical potential of various multiple antenna techniques, remain. Drawing on this untapped potential can provide one way of meeting increasing demands.

However, several obstacles exist to meeting increasing demands with theoretical gains from multiple antenna techniques. For example, barring the creation of an entirely new WWAN standard, implementation of new multiple antenna techniques takes place within the confines of existing WWAN standards. Implementation can involve meeting demands placed on new techniques imposed by existing wireless standards. Furthermore, implementation may involve working around existing infrastructure and limits imposed by existing standards. Therefore, harnessing gains from potential multiple antenna techniques requires innovation to determine multiple antenna techniques suitable to existing WWAN standards and to implement such techniques within those standards.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1A is a block diagram illustrating the use of an array with multiple antenna elements to achieve a certain degree of diversity gain and spatial multiplexing gains consistent with existing Wireless Wide Area Network (WWAN) standards;

FIG. 1B is a block diagram illustrating the use of an array that can take advantage of a trend in WWAN standards that accommodates increasing numbers of antenna elements to achieve large increases in diversity gains and spatial multiplexing gains by opening up a new, vertical dimension in which these gains can be achieved;

FIG. 2A is a block diagram illustrating spatial multiplexing with respect to a vertical dimension consistent with a coherent WWAN, such as a WWAN consistent with the Third Generation Partnership Project (3GPP) Long Term Evolution (LTE) standards, that relies on channel measurement reports to obtain channel knowledge, consistent with various examples;

FIG. 2B is a block diagram illustrating an optimization of vertical beam configurations with respect to a UE distribution, consistent with various examples;

FIG. 3A is a block diagram illustrating potential unequal load distributions with respect to different vertical beams formed through spatial multiplexing, consistent with various examples;

FIG. 3B is a block diagram illustrating a contributing factor to potential unequal load distributions with respect to different vertical beams formed through spatial multiplexing, consistent with various examples;

FIG. 8A is a block diagram illustrating the optimization of downlink data transmission in a multiple antenna environment that supports three or more layers of spatial multiplexing through Cyclic Delay Diversity and rotation matrices, consistent with various examples;

FIG. 8B is a block diagram illustrating the optimization of downlink data transmission in multiple antenna environments that supports more than three layers of spatial multiplexing through Cyclic Delay Diversity and rotation matrices, consistent with various examples;

Figure 4:
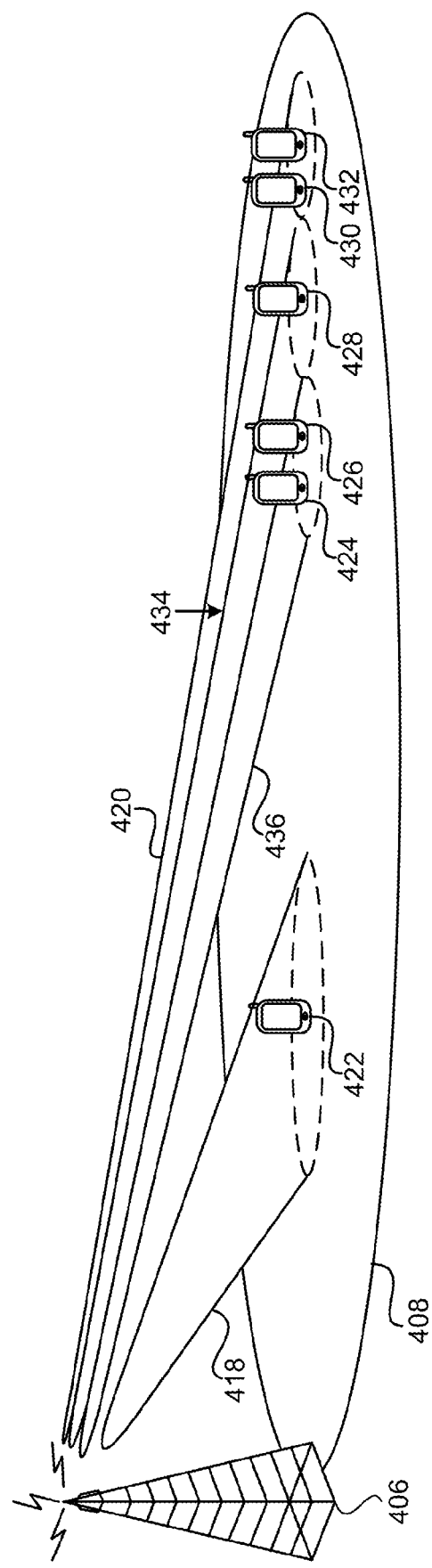
FIG. 4 is a block diagram illustrating the allocation of resources, such as Channel State Information-Reference Signals (CSI-RSs) to accommodate for differing loads associated with different vertical beams formed through spatial multiplexing, consistent with various examples.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As an important statement of the generality of examples discussed in this disclosure, while the terminology of the Third Generation Partnership Project (3GPP) Long Term Evolution (LTE) standard is often used throughout this specification, it is not intended to be limiting, and there are exceptions in the use of more general terminology in portions of this specification to further communicate this point.

Different terminology for wireless mobile devices is used in different specifications. As used herein, a wireless mobile device can be a User Equipment (UE) or a Mobile Station (MS), among other possibilities. Throughout this application, the terms wireless mobile device, UE, and MS can be used interchangeably.

As used herein the term "transmission point" is defined as a wireless communication device in a Wireless Wide Area Network (WWAN) configured to communicate with a plurality of wireless mobile devices located within a geographic region referred to as a coverage area. Different terminologies for transmission points are used in different specifications. Terminology used for different variations of a transmission point can include, but are not limited to, a Base Station (BS), an evolved Node B (eNodeB), a WWAN transmission point, a transmission point, a wireless transmission point, and a WWAN node. The terms are used interchangeably, unless otherwise noted. The actual definitions for a BS, or eNodeB, are provided in their Institute of Electronics and Electrical Engineers (IEEE) 802.16 and Third Generation Partnership Project (3GPP) specifications.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology, nor is it intended to limit the scope of the claimed subject matter.

By way of preliminary explanation, the teachings in this application claim priority to U.S. Provisional patent application Ser. No. 61/667,325, filed Jul. 2, 2012, before the official release of Release 11 of the Third Generation Partnership Project (3GPP) Long Term Evolution (LTE) standard. However, the innovations disclosed in that provisional and in the present application were made under an understanding that certain functionalities would be incorporated into Release 11.

The official release of Release 11 does in fact incorporate those functionalities. For purposes of enablement, many of those functionalities, presupposed by the current disclosure, are referenced herein to Release 11, as official released in the third quarter of 2012. The disclosure follows herein below.

To more fully realize potential gains, such as diversity gain, array gain, and spatial multiplexing gain, of multiple antenna techniques, arrays with greater numbers of antenna elements can be deployed. The additional antennas involved, their potential configurations, and their capabilities can be integrated within existing wireless communication standards, such as the Third Generation Partnership Project (3GPP) Long Term Evolution (LTE) standard.

Increased numbers of antenna elements can be used to provide further directionality for a radiation beam used as a communication path. As can be appreciated, spatial multiplexing gain can be enhanced in this way. For example, an antenna array with a larger number of elements can be configured in two dimensions to create a two dimensional (2D) antenna array. The 2D array can form a radiation beam, or a communication path, that has a pointing capability that can be defined both horizontally and vertically. As can also be appreciated, such enhanced spatial multiplexing can be used to enhance Multiple Input Multiple Output (MIMO) technologies to increase spectral efficiency.

Furthermore, antenna elements can be combined in all manner of ways to form one or more virtualized antennas, as set forth, for example, in Release 11 of the 3GPP LTE standards. At a certain level, such as from the perspective of a Uniform Equipment (UE), component elements of a virtualized antenna can be transparent, such that multiple antenna elements can appear as one antenna. For example, although MIMO technologies have been standardized to support two, four, and eight antennas as of Release 11 of the 3GPP LTE standards, an operator can deploy a physical antenna array with many more than eight antenna elements.

To fully exploit the power associated with the increased spatial diversity and/or numbers of communication paths that can be provided by antenna arrays with increased numbers of antenna elements, such as 2D arrays, accommodations can be made to existing wireless communication standards. Such accommodations can include adjustments to reduce overhead for feedback and/or training associated with increased numbers of spatial layers. The accommodations can include utilization of existing reporting resources for channel information associated with the communication paths. Additional accommodations can address the use of codewords for increased numbers of spatial layers.

For example, channel information feedback from UEs can be reduced for increased numbers of communication paths by configuring UEs with a selection module. The selection module can select a subset of communication paths, such as a particular vertical beam configuration, for which to report channel information to the exclusion of other communication paths/beam configurations/spatial layers. The selection can be made on the basis of measurements of Reference Signals (RSs), such as Channel State Information-Reference Signals (CSI-RSs) in the context of the 3GPP LTE standards, corresponding to the various communication paths/beam configurations/spatial layers. In some examples, the selection can be made, for example, based on a superior spectral efficiency.

As an additional example, channel information feedback from UEs can be reduced for increased numbers of communication paths/beam configurations/spatial layers by reporting virtual measurements. One example of such a virtual measurement can be based on an offset. The offset can be calculated based on a difference between a reference RSs for a reference beam configuration and an additional RS for an additional beam configuration. The reference RSs can be configured for a full set of antenna ports, where each antenna port can comprise a possible virtual antenna configuration, at a first beam configuration. The additional RS can come from a subset of additional RSs configured for a subset of antenna ports from the full set of antenna ports for the additional vertical beam configuration. The offset can be used to calculate a virtual measurement for the full set of antenna ports of the additional vertical beam configuration, without taking measurements for all of the antenna ports of the additional second beam configuration.

A second example of a virtual measurement can be based on a cross correlation value between two vertical beamforming weights for two vertical beam configurations. The beamforming weights for the first vertical beam configuration can be communicated to a UE that calculates the cross correlations. The UE can then determine beamforming weights based on a measurement of a set of additional RSs for a subset of antenna ports for the additional vertical beam configuration.

Channel information can be reported from the UE back to the eNodeB providing the RSs from which the channel information was measured. For examples consistent with the 3GPP LTE standards, the report can be a Channel State Information-Reference Signal (CSI-RS) report that can comprise various CSI message types. These various Channel State Information (CSI) message types can be tailored to a number of antenna ports and/or a Physical Uplink Control CHannel (PUCCH) type, as discussed below.

In some examples, the multiple spatial layers that can be generated by increasing antenna elements in an array can result in a need to share codewords for DownLink (DL) data transmissions, such as Physical Downlink Shared CHannel (PDSCH) transmissions consistent with LTE standards. This concern can have particular force in the context of the 3GPP LTE standards where only two codewords are available. However, an energy differential between spatial communication paths, or layers, sharing a common codeword can be reduced by multiplying a column vector carrying symbols from those layers by a rotation matrix. By multiplying by the rotational matrix, the symbols from the common codeword can be combined to equalize transmission energy. Additional spatial diversity can also be generated for the layers by multiplying by a Cyclic Delay Diversity (CDD) matrix. A more detailed discussion follows below.

FIG. 1A depicts the use of an array 102a comprising eight antenna elements (a representative antenna element 104 is indicated with an arrow) to achieve a certain degree of spatial multiplexing with respect to a horizontal dimension. Each of the antenna elements can correspond to an antenna port. Eight antenna elements are depicted, consistent with the maximum eight antenna ports supported for MIMO in the 3GPP LTE standards, but other numbers of antenna ports and/or elements are also possible, such as the two and four antenna ports also supported for MIMO in the 3GPP LTE standards.

Three arrows emanating from the array 102a in different directions, two dashed arrows to the right and left and a solid arrow normal to the plane of the array, depict the directionality that the array can create for communication paths with respect to a single horizontal dimension. The array can be mounted on a transmission point 106a, such as an eNodeB, with a corresponding coverage area 108a. The horizontal directivity provided by the array is depicted by three different beam direction geometries, from left to right 110a, 112a, and 114a. A beam direction geometry can depict a region with respect to the transmission point where a corresponding signal is highest, but the corresponding signal may be present in other regions as well. The curved arrow indicates that the three different beam direction geometries belong to a continuum of different possibilities.

FIG. 1B depicts the use of an array 102b with an increased number of antenna elements, such that a 2D array can be formed. The 2D array comprises a set of eight columns (a representative column 116) is indicated with an arrow). As can be appreciated, the 64 antenna elements outnumber the eight maximum antenna ports that are supported for MIMO in the 3GPP LTE standards and likely outnumber other maximum support numbers for other standards. However, multiple antenna elements can be combined into a virtual antenna, such as described for Release 11 of the 3GPP LTE standards, corresponding to a single antenna port. For example, each row or column could correspond to a single antenna port. Any combination of antenna elements could make up an antenna port.

Three arrows emanating from the array 102b in different directions, two dashed arrows above and below a solid arrow normal to the plane of the array, depict the directionality that the array can create for communication paths with respect to a vertical dimension. The array can be mounted on a transmission point 106b, such as an eNodeB, with a corresponding coverage area 108b.

The vertical directivity provided by the array is depicted by two different beam direction geometries, a first beam direction geometry 118 closer to the transmission point 106b and a second beam direction geometry 120 further away. As before, a beam direction geometry can depict region with respect to the transmission point where a corresponding signal is highest, but the corresponding signal can be present in other regions as well. The curved arrow indicates that the two different beam direction geometries belong to a continuum of different possibilities.

Although vertical elements of the array 102b allow for vertical directionality, as depicted in FIG. 1B, the horizontal elements also make horizontal directionality possible, as also described with respect to FIG. 1A. Therefore the communications can be directed in two dimensions to point toward a location in three dimensional space. The extra dimension can greatly increase the number of possibilities for directionality, allowing for increased numbers of communication paths, beam configurations, or layers, for spatial multiplexing. Throughout this application, the number of communication paths, beam configurations, or layers for spatial multiplexing can be referred to as the "rank." The spatial diversity can be used to further approach theoretical possibilities for MIMO. The use of a 2D array in this way is referred to in this application as Three Dimensional (3D) MIMO.

The ability to vertically tilt beams/communication paths afforded by a 2D array can be used to vertically tilt beams/communication paths to point to near and far users, respectively. However, such vertically tilted beams/communication paths require support. For example, coherent WWANs, such as a WWAN consistent with the 3GPP LTE standards, rely on channel measurement reports to obtain channel knowledge. This channel knowledge can be used to insure communications over vertically tilted beams/communication paths and to train and optimize those vertically tilted beams/communication paths.

FIG. 2A depicts spatial multiplexing with respect to a vertical dimension in relation to UEs from which channel knowledge can be obtained. An eNodeB 206a is depicted together with a portion of a corresponding coverage area 208a. A 2D array 102b disposed at the eNodeB can be employed to configure a first vertical beam configuration with a corresponding beam direction geometry 218a pointing downward to a region near the eNodeB. The 2D array 102b disposed at the eNodeB can also be employed to configure a second vertical beam configuration with another corresponding beam direction geometry 220a pointing outward to a region further away from the eNodeB.

The first vertical beam configuration 218a can be pointed downward to a region in which a first UE 222a is located. The more outward region of the second vertical beam configuration 220a can be more directed toward a second UE 224a. As before, a beam direction geometry can depict region with respect to the transmission point where a corresponding signal is highest, but the corresponding signal may be present in other regions as well. Study indicates that two vertical beam configurations can provide marked gains. However, a single vertical beam configuration and more than two vertical beam configurations are consistent with many examples.

Communications can be supported over the first vertical beam configuration 218a and the second vertical beam configuration 220a by coherent channel estimation techniques that can rely on Reference Signals (RSs) known to the first UE 222a and the second UE 224a and transmitted by the eNodeB 206a. A UE can make a measurement of a RS and report back the measurement to the eNodeB to provide channel information. In examples consistent with the 3GPP LTE standards, the RSs can comprise CSI-RSs.

For example, the eNodeB 206a can configure multiple RS/CSI-RS resources. An RS/CSI-RS resource can be vertically beamformed with a beamforming vector. Different RS/CSI-RS resources within the multiple RS/CSI-RS resources can be configured to be vertically beamformed differently, with different beamforming vectors. With respect to FIG. 2A, for example, one or more RS/CSI-RS resources can be configured for the first vertical beam configuration 218a, and one or more RS/CSI-RS resources can be configured for the second vertical beam configuration 220a.

Although the beam direction geometry of the first vertical beam configuration 218a is depicted as being directed to the location of the first UE 222a and the beam direction geometry of the second vertical beam configuration 220a is depicted as being directed toward the second UE 224a, as stated, transmissions corresponding to both vertical beam configurations can be received throughout the portion of the coverage area 208a corresponding to the eNodeB 206a. Therefore, the first UE and/or the second UE can report measurements for both the first vertical beam configuration 218a and the second vertical beam configuration 220a. Similarly, the first UE, the second, and/or additional UEs can report measurements for greater numbers of vertical beam configurations.

For example, a UE 222a, 224a can be configured with a reporting instance, such as a CSI/RS report resource, per RS/CSI-RS resource to provide information for multiple vertical beam configurations, such as the first beam configuration 218a and the second vertical beam configuration 220a in FIG. 2A and, potentially, all vertical beam configurations. Depending on the example, the Interference Measurement Resources (IMRs) for multiple CSI/RS reporting instances can be the same or different. Configuring a UE with multiple reporting instances for multiple different beam configurations, albeit not specifically vertical beam configurations, is already supported within the specification of Release 11 of the 3GPP LTE standards. However, one drawback for this scheme is the CSI feedback overhead increases linearly with the number of semi-static beamformed RS/CSI-RS resources for which a UE is configured with a reporting instance.

In some examples, in order to assist the network in the configuration of static beams in relation to UEs for measurements of RS/CSI-RS resources, one or more UEs can provide reports, such as Reference Signal Received Power (RSRP) and Reference Signal Received Quality (RSRQ) messages in the 3GPP LTE standards. Such reports can be used to adjust one or more vertical beam configurations to better coincide with a distribution of UEs.

FIG. 2B depicts an optimization of vertical beam configurations with respect to a UE distribution. As with the previous figure, an eNodeB 206b is depicted together with a portion of a corresponding coverage area 208b. A first vertical beam configuration with a corresponding beam direction geometry 218b and a second vertical beam configuration with another corresponding beam direction geometry 220b are also depicted with respect to the first UE 222b and the second UE 224b.

The first UE 222b and the second UE 224b are depicted in the same locations relative to the eNodeB 206b in FIG. 2A and FIG. 2B. Also, the first vertical beam configuration 218b is tilted in relation to the first UE 222b in the same way in FIG. 2A and FIG. 2B. However, the relative tilting of the second vertical beam configuration 222b with respect to the second UE 224b has been optimized in relation to the second UE so that the second vertical beam configuration is tilted to be centered upon the second UE.

To accomplish such an optimization, an iterative process can be used whereby one or more UEs within a UE distribution provide reports of RS/CSI-RS measurements, such as RSRP and RSRQ messages. One or more vertical beam configurations can then be adjusted by a predetermined amount toward or away from the eNodeB 206b. One or more additional RS/CSI-RS resources can then be provided and one or more measurements made. This process can continue until one or more vertical beam configurations are optimized with respect to the relevant UE distribution. Vertical beam configurations can be optimized in other ways as well.

FIG. 3A depicts potential unequal load distributions with respect to different vertical beams formed through spatial multiplexing. As in previous figures, an eNodeB 306a is depicted together with a portion of a corresponding coverage area 308a. A first vertical beam configuration with a corresponding beam direction geometry 318a and a second vertical beam configuration with another corresponding beam direction geometry 320a are also depicted with respect to an increased number of UEs (322a-328a).

The first vertical beam configuration 318a is directed downward near the eNodeB 306a and toward the first UE 322a. The second vertical beam configuration 320a can be directed outward from the eNodeB to three additional UEs, a second UE 324a, a third UE 326a, and a fourth UE 328a. For various reasons, it can commonly be the case that vertical beam configurations directed further away from an eNodeB can have larger loads than vertical beam configurations directed closer to an eNodeB. For example, as can be appreciated from FIG. 3A, the angle of incidence of the second vertical beam configuration can result in the beam direction geometry of the second vertical beam covering an increased swath of the portion of the coverage area 308a corresponding to the eNodeB 306a. FIG. 3B can be used to explain an additional reason for higher potentials for higher loads for vertical beam configurations directed away from an eNodeB.

FIG. 3B depicts an additional contributing factor to potential unequal load distributions with respect to different vertical beams. Again, the eNodeB 306b is depicted, but this time a more complete coverage area 308b all around the eNodeB is depicted more from an angle closer to the normal of the plain of the coverage area. The coverage area can be discussed with respect to four different quadrants.

The lower, right-hand quadrant can be considered to pertain to the portion of the portion of the corresponding coverage area 308a depicted with respect to FIG. 3A. Within the lower, right-hand quadrant, the first UE 322b is depicted as located within a first ring 318b, depicted with diagonal cross hatching and corresponding to a vertical swath from the eNodeB 306a that can be illuminated by the beam direction geometry of the first vertical beam configuration 318a, as rotated around the eNodeB 306a. Also, the second UE 324a, the third UE 326a, and the fourth UE 328a are depicted as located within a second ring 320b, depicted with diagonal cross hatching in the opposite direction and corresponding to a vertical swath that can be illuminated by the beam direction geometry of the second vertical beam configuration 320a with a similar rotation.

As can be appreciated from the equation for the area of a ring, $A=\pi(r_2^2-r_1^2)$, the greater the distances from the eNodeB 306b, the greater the area in which UEs can be disposed, where the difference between the two radii of two rings are equal. This result will hold true when the rings are subdivided into quadrants, as in FIG. 3B. Furthermore, for the reason discussed above, the distances between the radii corresponding to vertical beam configurations further from an eNodeB will be greater do to the larger footprints illuminated by the corresponding smaller angles of incidence. Therefore, vertical beam configurations directed further away from an eNodeB are likely to experience larger loads that can lead to an unbalance.

FIG. 4 depicts the creation of multiple additional, more finely configured vertical beam configurations to compensate for potential imbalances further away within a portion of a coverage area 408 of an eNodeB 406. A first UE 422 can be located within the beam direction geometry of a first vertical beam configuration 418. Five additional UEs 424, 426, 428, 430, and 432 can be located within an area corresponding to the beam direction geometry of a second vertical beam configuration 320 depicted in FIG. 3A. However, the second vertical beam configuration has been replaced in FIG. 4 with a second vertical beam configuration 420, a third vertical beam configuration 434, and a fourth vertical beam configuration 436, each with corresponding beam direction geometries that are more narrow than the previous second vertical beam configuration 320. A decision to increase a number of beam configurations can result from an iterative process.

By increasing the number of vertical beam configurations, imbalances can be reduced. As can be appreciated, the number of UEs within the beam direction geometry of any given vertical beam configuration has been reduced from five to two in FIG. 4. However, the additional numbers of vertical beam configurations also can result in burdensome levels of overhead.

For example, each vertical beam configuration can include one or more RS/CSI-RS resources specific to that vertical beam configuration. Vertical beam configurations can add even more RS/CSI-RS resources to those previously existing for beam configurations previously limited to a horizontal domain. Additionally, each UE can be configured with a different reporting resource for each RS/CSI-RS resource. Although only a small number of UEs have been depicted in the previous figures, larger numbers of UEs are consistent with many examples. Furthermore, additional overhead can be involved during iterative training processes, similar to those discussed above.

The largest impact on the size of overhead in providing channel information feedback can be the number of CSI-RS resources configured by an eNodeB. Where the burden of such overhead becomes too big, the number of UE reports can become compressed. For example, UEs can be configured with fewer numbers of reporting instances than RS/CSI-RS resources transmitted in the various beam configurations. Although UEs can continue to receive multiple RS/CSI-RS resources for multiple different beam configuration, they can limit their reports to a subset of such RS/CSI-RS resources. UEs can continue to make measurements of the multiple RS/CSI-RS resources that they receive. However, UEs can select a subset of these measurements for which to respond with a channel information report.

For purposes of illustrating an example, reference can be made to FIG. 2B. The first vertical beam configuration 218b and the second vertical beam configuration 220b can both be configured with RS/CSI-RS resources. Although the first UE 222b is centered within the beam direction geometry of the first vertical beam configuration and the second UE 224b is centered within the beam direction geometry of the second vertical beam configuration, as explained previously, transmission from the first vertical beam configuration and the second vertical beam configuration can be received by both the first UE and the second UE. Both UEs can make measurements of RS/CSI-RS resources configured for both vertical beam configurations.

However, to reduce overhead, the first UE 222b and the second UE 224b can each select a subset of the RS/CSI-RS resources, corresponding to either the first vertical beam configuration 218b or the second vertical beam configuration 220b, for which to provide a report. By selecting one beam configuration, or the corresponding subset of RS/CSI-RS resources, as reporting CSI-RS resource, multiplication of CSI-RS reports for the multiple CSI-RSs resources can be avoided by leaving a set of non-selected CSI-RS resources unreported. In the example depicted in FIG. 2B, the first UE can choose to report on the RS/CSI-RS resource(s) associated with the first vertical beam configuration. The second UE can choose to report on the RS/CSI-RS resource(s) associated with the second vertical beam configuration.

The first UE 222b and the second UE 224b can make their selections based on measurements of the RS/CSI-RS resources for the two vertical beam configurations 218b, 220b. In some examples, the decision can be made on the basis of vertical beam configuration demonstrates a superior spectral efficiency. However, any other metric, or combination of metrics, based on measurements of beam configuration transmissions can serve as a basis for making one or more selections by a particular UE.

In many examples, the vertical beam configurations corresponding to the multiple CSI-RS resources can be transparent to UEs and selections can be based solely on values derived from measurements. A UE can then prepare a report on channel information, such as a CSI-RS report, based on a selected measurement. The UE can then send the report back to the eNodeB associated with the vertical beam configuration measured and selected by the UE. In some examples, the report can include a CSI-RS resource index for corresponding to the vertical beam configuration selected by the UE.

After an eNodeB 206b receives a report, including, for example, a recommended CSI-RS index, the eNodeB can determine one or more vertical beamforming weights. In examples where reports indicate that there are much fewer users in the cell center than the edge, the beam pointing to the center may be allocated with less RS/CSI-RS resources, which can correspond to an allocation of fewer antenna ports at that vertical beam configuration. In certain examples, different vertical beam configurations can be configured with different RS/CSI-RS resources by being configured with different repetition periods. In some examples, vertical beam configuration determinations can be made at a network level, as opposed to at an individual eNodeB.

Although the preceding discussion focuses on two vertical beam configurations, selections can be made from any number of vertical beam configurations. Also selections can be made to report on a subset of vertical beam configurations with more than one vertical beam configuration. Furthermore, the preceding techniques can be applied to beam configurations generally, including to horizontal beam configurations, not just for vertical beam configurations.

Figure 5:
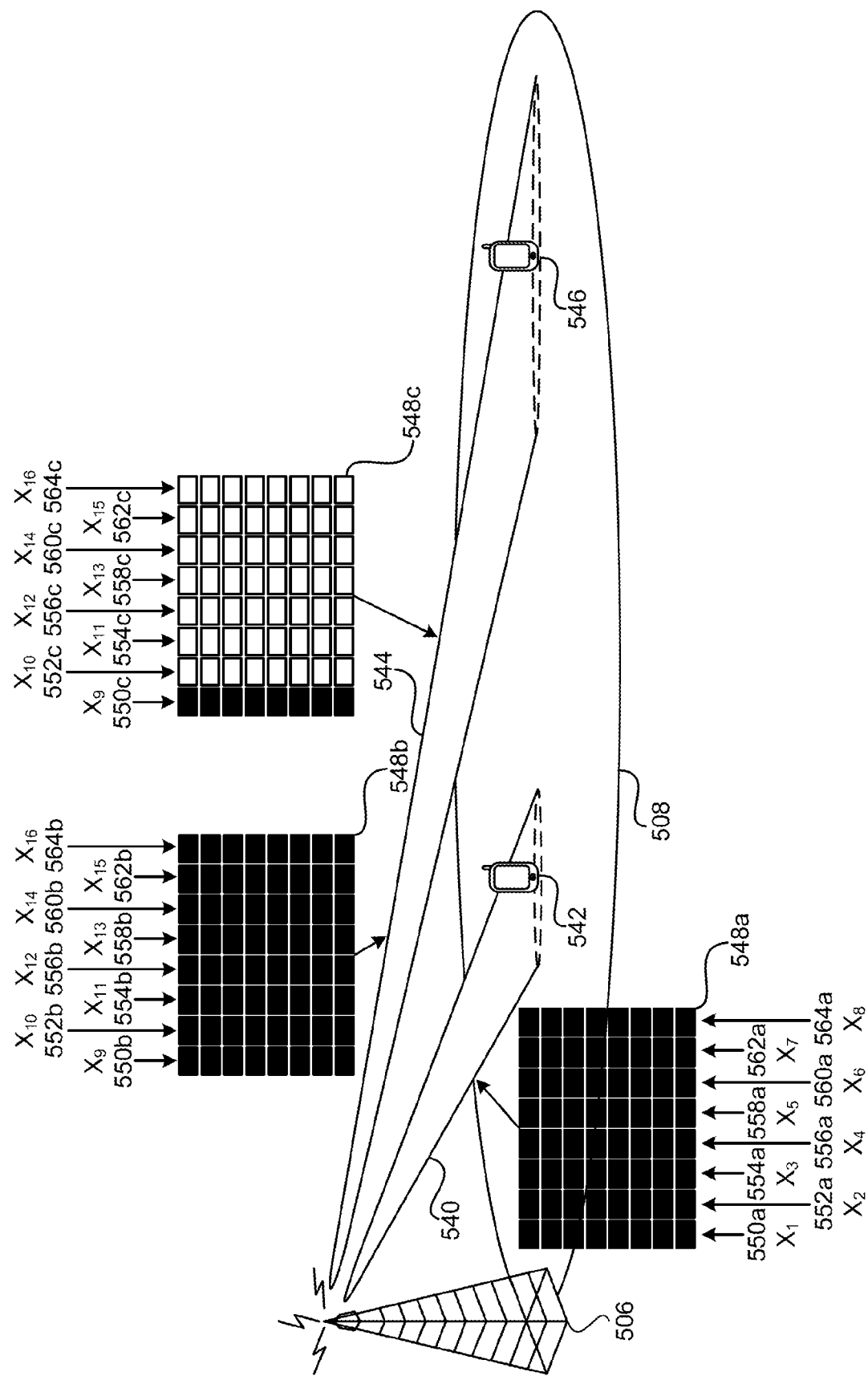
FIG. 5 is block diagram illustrating reduced channel measurement overhead for spatial multiplexing based on a virtual measurement derived from a difference calculated between a full antenna port measurement and a partial antenna port measurement for two differing vertical beam configurations, consistent with various examples.

FIG. 5 depicts another example for reducing channel measurement overhead associated with vertical spatial multiplexing. A portion of a coverage area 508 associated with an eNodeB 506 is depicted. A beam direction geometry associated with a first vertical beam configuration 540 is depicted as being directed downward to a first UE 542. Also depicted is a beam direction geometry associated with a second vertical beam configuration 544 directed outward from the eNodeB toward a second UE 546.

Representations of a 2D array 548, deployed at the eNodeB 506, are depicted in FIG. 5. Three instances of the 2D array (548a, 548b, 548c) are depicted in terms of transmissions for three different relationships between antenna ports, beam configurations, and RS/CSI-RS reports. The three different transmission relationships correspond to traditional approaches for providing channel information feedback for the first vertical beam configuration 540 and the second vertical beam configuration 544 and new approaches that reduce the amount of corresponding overhead. For each of these three relationships, the 2D array is depicted with sixty-four antenna elements (8×8=64). However, other numbers of antenna elements are possible. Multiple antenna elements can be configured to comprise a single virtual antenna.

A virtual antenna can correspond to an antenna port. Multiple antenna elements combined within a virtual antenna, or antenna port, can be transparent to UEs 542, 546 deployed within the partial coverage area 508, such that the multiple antenna elements of the antenna port appear to the UEs as a single antenna. Any combination of antenna elements can be combined to form a virtual antenna, or antenna port. In examples similar to the one depicted in FIG. 5, each of the eight columns (550-564) of the 2D array 548 can comprise an antenna port, e.g., $X_1, X_2, X_3, X_4, X_5, X_6, X_7, X_8$. However, in some examples, antenna ports can include multiple columns, one or more rows, portions of one or more rows, portions of one or more columns, all columns, or any other combination.

Multi-beam antenna technologies, such as, by way of example and not limitation, phased array multi-beam antenna technologies, which can, but need not necessarily, employ one or more Butler matrices, can be used to increase a number of simultaneous beam configurations. Therefore, the same antenna elements can be reused to create additional antenna ports configured for simultaneous, but differing beam configurations. Hence, the eight columns (550-564) of the 2D array 548 can also be used to create eight additional antenna ports, namely, $X_9, X_{10}, X_{11}, X_{12}, X_{13}, X_{14}, X_{15}, X_{16}$ for the second vertical beam configuration.

Channel response differences between antenna ports, due, for example, to spatial and/or spectral diversity, can be addressed by providing individual antenna ports with RS/CSI-RS resources. Each antenna port can be configured to transmit its own RS/CSI-RS resource. Additional antenna ports can be configured with additional RS/CSI-RS resources to allow for multiple different beam configurations.

Under traditional approaches for providing channel information feedback, a different RS/CSI-RS resource can be provided for each antenna port. For example, the eight antenna ports ($X_1, X_2, X_3, X_4, X_5, X_6, X_7, X_8$) over which the first vertical beam configuration 540 in FIG. 5 can be transmitted can each have a RS/CSI-RS resource. Each of the antenna elements in the first instance of the 2D array 548a for the first vertical beam configuration has been filled in to indicate that each of the eight antenna ports carries a different RS/CSI-RS resource.

With respect to the second instance of the 2D array 548b, additional antenna ports can be provided for transmission of different beam configurations, such as the eight additional antenna ports ($X_9, X_{10}, X_{11}, X_{12}, X_{13}, X_{14}, X_{15}, X_{16}$) over which the second vertical beam configuration 544 in FIG. 5 is transmitted. As with the first vertical beam configuration 540, a different RS/CSI-RS resource can be provided for each new antenna port for the second beam configuration for providing channel information feedback, consistent with traditional approaches. As can be appreciated, sixteen RS/CSI-RS resources would be involved in the feedback overhead under such traditional approaches, and this number could further be multiplied for additional beam configurations.

With respect to the vertical beam configurations depicted in FIG. 1B through FIG. 4, each of these vertical beam configurations can similarly be configured for multiple antenna ports. Therefore, each of these vertical beam configurations can entail multiple RS/CSI-RS resources for the various antenna ports configured for a vertical beam configuration. As discussed, one way of reducing feedback overhead can involve only providing reports of channel measurements for RS/CSI-RS resources for a subset of the total beam configurations.

However, additional new approaches can be applied to reduce overhead caused by such a large number of RS/CSI-RS resources, not only be reducing a number of reports on RS/CSI-RS resources, but by reducing the number of RS/CSI-RS resources themselves. According to examples consistent with such approaches, RS/CSI-RS resources can be provided for a full set of antenna ports for a first vertical beam configuration. Conversely, for one or more additional beam configurations, one or more additional RS/CSI-RS resources can be provided for a partial subset of a full set of antenna ports.

To a certain extent, the two different beamforming weights applied to the different antenna ports to create the two beam configurations can explain differences in the channel responses for the two different configurations. Inasmuch as the difference in vertical beamforming weights constitutes a dominate common factor in determining differences in channel responses between antenna ports for two different beam configurations, a difference between two antenna ports corresponding to two different beam configurations can be used to determine differences for other antenna ports pertaining to the two beam configurations.

For example, with respect to FIG. 5, each of the antenna ports configured for the first vertical beam configuration, antenna ports $X_1, X_2, X_3, X_4, X_5, X_6, X_7, X_8$, can transmit an RS/CSI-RS resource specific to that antenna port. Again, therefore, reference is made to the first instance of the 2D array 548a, wherein antenna elements corresponding to the various columns (550a-564a) that make up the eight aforementioned antenna ports are filled in, indicating that each of the eight antenna ports provides its own RS_CSI-RS resource. Since each antenna port has its own RS/CSI-RS resource, channel information feedback can be provided for each antenna port.

Conversely, a third instance of the 2D array 548c is depicted with only a single column of antenna elements 550c filled in, consistent with the new approaches described above. The single column of antenna elements that has been filled in corresponds to antenna port $X_9$, as configured for the second vertical beam configuration. These antenna elements are filled in to indicate that an RS/CSI-RS resource is provided for antenna port $X_9$, corresponding to the first column of antenna elements in the 2D array. An RS/CSI-RS resource is not provided for the remaining antenna ports, namely, antenna ports $X_{10}, X_{11}, X_{12}, X_{13}, X_{14}, X_{15}, X_{16}$, which are also configured for the second vertical beam configuration. Therefore, the columns of antenna elements (552c-564c) corresponding to antenna ports $X_{10}, X_{11}, X_{12}, X_{13}, X_{14}, X_{15}, X_{16}$ are not filled in.

Each antenna port of the first vertical beam configuration 540 has an analogous antenna port configured for the second vertical beam configuration 544 sharing antenna elements from a common column of antenna elements shared by the two antenna ports. (Antenna ports $X_1$ and $X_9$ share column 550; $X_2$ and $X_{10}$ share column 552; $X_3$ and $X_{11}$ share column 554; $X_4$ and $X_{12}$ share column 556; $X_5$ and $X_{13}$ share column 558; $X_6$ and $X_{14}$ share column 560; $X_7$ and $X_{15}$ share column 562; and, $X_8$ and $X_{16}$ share column 564.) The shared antenna elements suggest that the differing vertical beam directions can account for the dominant differences between pairs of antenna ports with respect to channel information. However, antenna elements need not be shared for differing vertical beam directions to account for these major differences.

A pair of RS/CSI-RS resources on two different antenna ports corresponding respectively to the first vertical beam configuration 540 and the second vertical beam configuration 544, such as $X_1$ and $X_9$, can be measured. An offset/beamforming gain, "c," can be calculated by taking the difference between measurements for the pair of RS/CSI-RS resources. Since the different vertical beam directions can be predominantly responsible for the offset, the same offset/beamforming gain can also account for differences at other antenna ports. In some embodiments, the offset/beamforming gain can be measured in decibels (dBs). However, the offset/beamforming gain can be measured in other ways, based on differences between measurements and can take positive or negative values.

Hence, with RS/CSI-RS resources for a full set of antenna ports for one beam configuration, to account for differences between pairs of antenna ports and a single RS/CSI-RS resource for a second beam configuration, a virtual measurement can be generated. The virtual measurement can provide information for a channel response for the second beam configuration for the full set of antenna ports, or any subset thereof, even though just one RS/CSI-RS resource has been provided for the second beam configuration.

For example, with respect to FIG. 5, a virtual measurement for the entire second vertical beam configuration, in terms of 'c,' the offset/beamforming gain calculated as the difference between measurements of the pair of RS/CSI-RS resources for antenna port $X_1$, with respect to the first vertical beam configuration 540 and antenna port $X_9$, with respect to the second vertical beam configuration 544. Such a virtual measurement for the second vertical beam configuration, "$v_{m2}$," can be calculated as $v_{m2}=[X_1+c$ (or $X_9$), $X_2+c, X_3+c, X_4+c, X_5+c, X_6+c, X_7+c, X_8+c]$ where $X_1, X_2, X_3, X_4, X_5, X_6, X_7,$ and $X_8$ can be measured with respect to the first vertical beam configuration.

In some examples, RS/CSI-RS resources can be provided for one beam configuration for all possible antenna ports, such as ports $X_9, X_{10}, X_{11}, X_{12}, X_{13}, X_{14}, X_{15},$ and $X_{16}$ for the second vertical beam configuration 544. A virtual measurement can then be provided for any number of antenna ports for any number of different additional beam configurations, vertical or otherwise, as long as at least one RS/CSI-RS resource is provided for at least one antenna port for at least one additional beam configuration. As a result, feedback overhead can be greatly reduced, not just in terms of channel measurement reports based on RS/CSI-RS resources, but also in terms of the underlying RS/CSI-RS resources.

For example, with n+1 RS/CSI-RS resources and with n+1 reports, where n is equal to a maximum possible number of antenna ports for a possible beam configuration, a virtual measurement can be made for any number of antenna ports for a second possible beam configuration. In the example depicted in FIG. 5, n=8 because there are only eight potential antenna ports. Therefore, with nine RS/CSI-RS resources, a report can be made for any combination of the sixteen antenna ports used for the two different vertical beam configurations.

The first UE 542 and/or the second UE 546 can receive from the eNodeB 506 CSI-RS resources configured for a full set of antenna ports $(X_1, X_2, X_3, X_4, X_5, X_6, X_7, X_8)$ (550a-564a) for a reference vertical beam configuration 540. The first UE 542 and/or the second UE 546 can also receive a set of additional CSI-RSs resources configured for at least one subset (550b-556b) of a full set (550b-564b) of antenna ports (e.g., $X_9$) for at least one additional vertical beam configuration 544. One or more UEs can measure reference channel response information for the reference RS/CSI-RS resources and additional channel response information for the set of additional RS/CSI-RS resources.

The UEs can then calculate an offset/beamforming gain between the reference vertical beam configuration 540 and at least one of the set of additional vertical beam configurations 544 with the reference channel response information and the additional channel response information. One or more of the first UE 542 and/or the second UE 546 can report channel response information for the reference vertical beam configuration and a unit of virtual channel response information to the eNodeB 506 for any combination of antenna ports for the at least one of the set of additional vertical beam configurations.

Alternatively, a UE can simply feedback measurements and leave the calculation of an offset/beamforming gain and the compensation procedure to the eNodeB 506. These approaches can be applied to any number of beam configurations generally, including horizontal beam configurations, not just vertical beam configurations. Other consistent examples for reducing RS/CSI-RS resources can be implemented based on cross correlation measurements.

Figure 6:
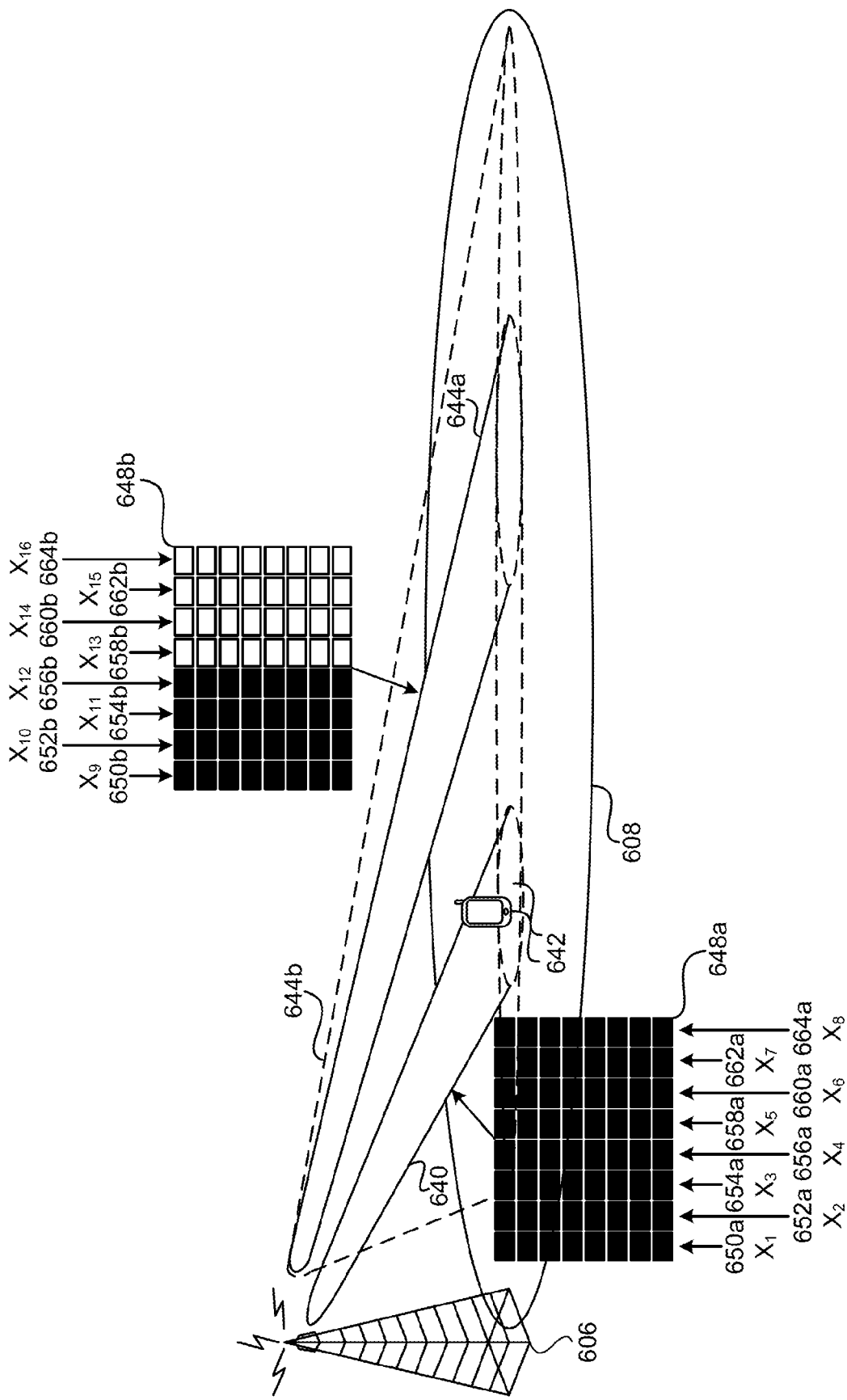
FIG. 6 is block diagram illustrating reduced channel measurement overhead for vertical spatial multiplexing based on cross-correlation, consistent with various examples.

FIG. 6 depicts an example where cross-correlation can be used to reduce channel measurement overhead. A portion of a coverage area 608 associated with an eNodeB 606 is depicted. A beam direction geometry associated with a first vertical beam configuration 640 is depicted as being directed downward to a UE 642. Also depicted are a beam direction geometry associated with a second vertical beam configuration 644a and an additional reception area associated with a second vertical beam configuration 644b.

Two different aspects of an 8×8 2D antenna array 648a, 648b are depicted corresponding to different relationships between vertical beam configurations, antenna ports, and RS/CSI-RS resources, in an example where cross-correlation can be used to reduce channel measurement overhead. Although the antenna array is depicted as an array of 8×8 elements, as can be appreciated, other combinations are consistent with additional examples.

As depicted with respect to the first aspect of the 2D antenna array 648a, the first vertical beam configuration 640 can be configured for eight antenna ports $(X_1, X_2, X_3, X_4, X_5,$ $X_6$, $X_7$, $X_8$), although other numbers of ports are possible, where each antenna port corresponds to a column (650a-664a) in the array. As indicated by each antenna element of the eight columns corresponding to the eight antenna ports being filled in, each antenna port can transmit its own RS/CSI-RS resource. As depicted with respect to the second aspect of the 2D antenna array 648a, the second vertical beam configuration 644 is also configured for eight different antenna ports ($X_9, X_{10}, X_{11}, X_{12}, X_{13}, X_{14}, X_{15}, X_{16}$), sharing common antenna elements.

However, with respect to the second vertical beam configuration 644, RS/CSI-RS resources are provided for a partial subset of the full set of antenna ports, namely, the four antenna ports $X_9$, $X_{10}$, $X_{11}$, and $X_{12}$. Therefore, just the corresponding columns 650b-656b are depicted as filled in. Columns 658b-646b, which correspond to the antenna ports for which RS/CSI-RS resources are not provided on the second vertical beam configuration, namely, antenna ports $X_{13}$, $X_{14}$, $X_{15}$, and $X_{16}$, are left blank.

Although the partial subset of antenna ports with RS/CSI-RS resources for the second vertical beam configuration includes four elements, other numbers of elements are possible. By calculating an offset/beamforming gain, "c" with the eight RS/CSI-RS resources for the first vertical beam configuration 640 and with the four RS/CSI-RS resources from the second vertical beam configuration 644, channel response information can be calculated for the four antenna ports ($X_{13}$, $X_{14}$, $X_{15}$, $X_{16}$) for the second vertical beam configuration for which RS/CSI-RS resources are not provided. Therefore, the overhead associated with channel information feedback can be reduced, not only in terms of channel information reports, but also in terms of the underlying RS/CSI-RS resources. An additional cross-correlation approach for calculating the offset/beamforming gain, "c," is discussed below.

As a first step in obtaining the offset/beamforming gain, "c," the vertical beamforming weights applied to the antenna ports of the first vertical beam configuration can be transmitted to the UE 642. In examples consistent with the 3GPP LTE standards, the beamforming weights can be transmitted to the UE 642 through Layer 1, Layer 2, and/or Radio Resource Control (RRC) signaling. The beamforming weights can be received by the UE and used by the UE to assist vertical beamforming gain compensation, as described below.

Although the UE 642 is not located within the beam direction geometry of the of the second vertical beam configuration 644a, the UE is located within the additional reception area associated with a second vertical beam configuration 644b. Therefore, the UE 642 can receive the set of CSI-RS resources from antenna ports $X_{13}$, $X_{14}$, $X_{15}$, and $X_{16}$, corresponding to the second vertical beam configuration 644.

Based on the set of CSI-RS resources corresponding to the second vertical beam configuration 644, the UE 642 can determine beamforming weights for the second vertical beam configuration 644. In examples consistent with the 3GPP LTE standards, beamforming weights can be determined by measuring additional channel response information for the set of additional CSI-RSs. Based on the additional channel response information, the UE can select an appropriate Precoding Matrix Indicator (PMI). The UE can then use a codebook, which can be common to a codebook at the eNodeB 606, to determine the beamforming weights, as indexed by the PMI, for the second vertical beam configuration.

The UE 642 can then calculate a cross correlation between the vertical beamforming weights and the beamforming weights of the best vertical PMI. Once a cross correlation has been calculated, the UE 642 can assign the offset/beamforming gain, "c," based on the cross correlation. The offset/beamforming gain can be assigned to a value equal to the cross correlation between the vertical beamforming weights of the first vertical beam configuration and the beamforming weights of the best vertical PMI for the second CSI-RS resource. For example if the cross correlation is 0.5, the offset/beamforming gain value can be 3 dB. The UE can assign predetermined offset/beamforming gain value where the cross correlation is equal to 0. A non-limiting example provided by way of illustration for the offset/beamforming gain value can be 10 dB.

Once the offset/beamforming gain, "c," is calculated, a virtual measurement can be made for one or more of the antenna ports for which an RS/CSI-RS resource was not provided. The virtual measurement can be made by adding "c" to the measurement of a corresponding antenna port belonging to the first vertical beam configuration for which an RS/CSI-RS resource was provided, along the lines discussed with respect to the preceding figure. One or more of such measurements can then be reported to the eNodeB 606 by the UE 642. In certain examples, these calculations can be performed by the eNodeB.

Figure 7:
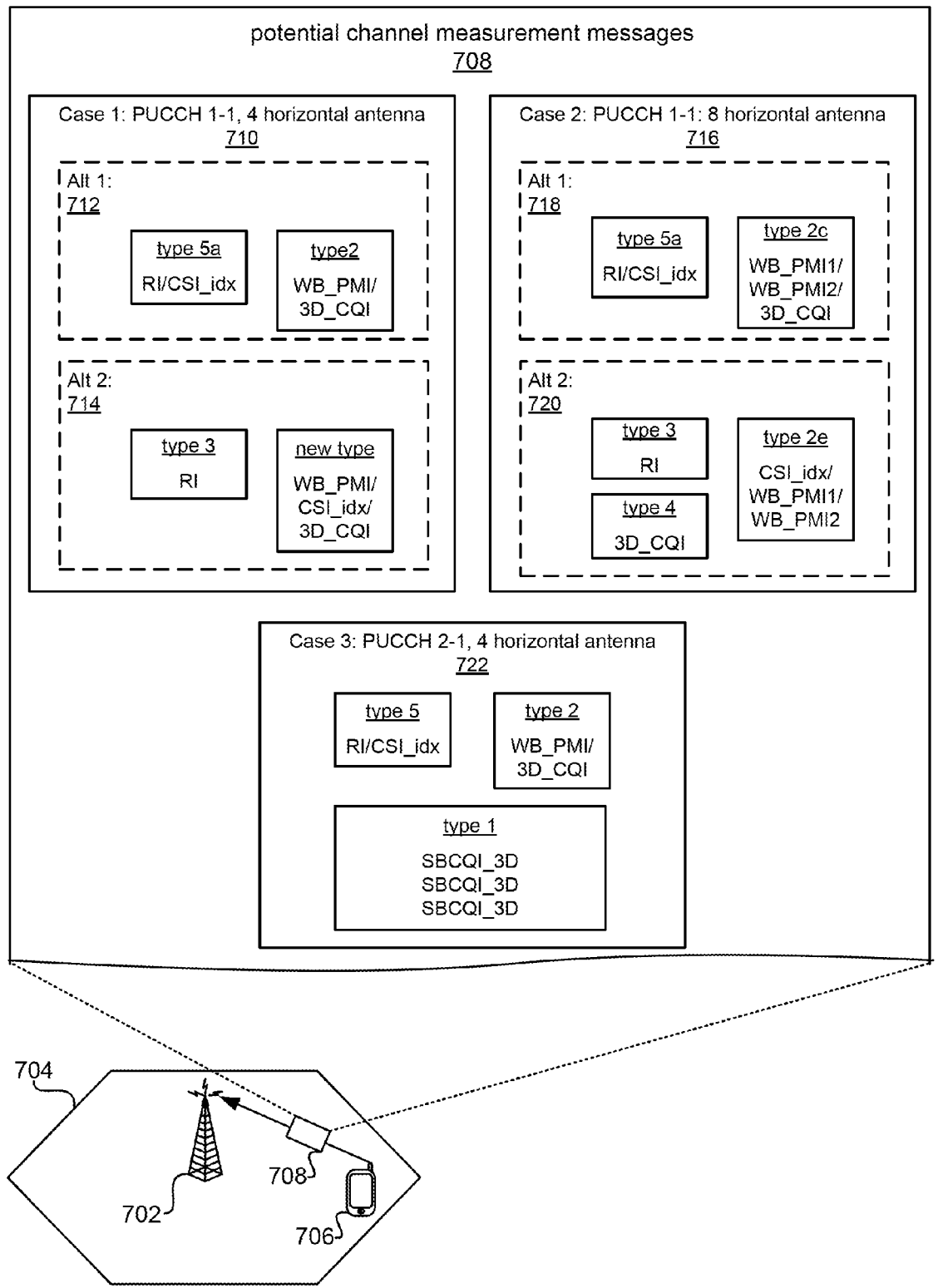
FIG. 7 is a block diagram illustrating various potential scenarios for reporting Channel State Information (CSI) that can accommodate vertical spatial multiplexing consistent with 3GPP LTE standards, consistent with various examples.

FIG. 7 depicts the reporting of channel measurement feedback. An eNodeB 702 with a corresponding coverage area 704 is depicted in FIG. 7. The eNodeB can provide multiple RS/CSI-RS resources in its transmissions. The UE 706 within the coverage area of the eNodeB can make measurements on those RS/CSI-RS resources with which to prepare a channel information report 708. Channel State Information (CSI) in the channel information report can accommodate vertical spatial multiplexing.

In examples consistent with the 3GPP LTE standards, the channel information report 708 can be a CSI-RS report that can include various CSI message types. For example, in a first potential case 710, the CSI-RS report can be configured with respect to multiple antenna ports that comprise two or four antenna ports for a PUCCH of mode 1-1. In such examples, the CSI-RS report 712 to the eNodeB can comprise both a CSI reporting type 5a message and a CSI reporting type 2 message.

The CSI reporting type 5a message can carry an RI and a CSI-RS indicator. The CSI-RS indicator can recommend a best CSI-RS resource based on a superior spectral efficiency. Throughout this application, a best CSI-RS resource can be correlated with a best beam configuration to which it belongs. The CSI reporting type 5a can be a new CSI reporting type, with a name consistent with the name conventions exemplified in Section 7.2.2 of Technical Specification (TS) 36.213 of Release 11 of the 3GPP LTE standards. However, since the CSI reporting type 5a can be a new CSI reporting type, throughout this application, the name CSI reporting type 5a can be replaced with an alternative name as long as an RI and a CSI-RS indicator are still carried by the message. The CSI reporting type 2 message can be consistent with the CSI reporting type 2 message discussed with respect to Section 7.2.2 of TS 36.213 of the 3GPP LTE standards for any of Releases 8 through 11. The CSI reporting type 2 message can carry a PMI and a Channel Quality Indicator (CQI) for the best CSI-RS resource recommended by the CSI-RS indicator.

Alternatively, for examples where the CSI-RS report can be configured for two or four antenna ports for a PUCCH of mode 1-1, the CSI-RS report 714 to the eNodeB 706 can comprise both a CSI reporting type 3 message and a CSI reporting type 2d message. The CSI reporting type 3 message can be consistent with the CSI reporting type 3 message discussed with respect to Section 7.2.2 of TS 36.213 of the 3GPP LTE standards for any of Releases 8 through 11. The CSI reporting type 3 message can carry an RI. The CSI reporting type 2d message can carry a CSI-RS indicator, a PMI, and a CQI. The CSI reporting type 2d can be a new CSI reporting type, with a name consistent with the name conventions exemplified in Section 7.2.2 of TS 36. 213 of Release 11 of the 3GPP LTE standards. However, since the CSI reporting type 2d can be a new CSI reporting type, throughout this application, the name CSI reporting type 2d can be replaced with an alternative name as long as a CSI-RS indicator, a PMI, and a CQI are still carried by the message.

Also, in a second potential case 716, the CSI-RS report can be configured with respect to eight antenna ports for a PUCCH of mode 1-1. In such examples, the CSI-RS report 718 to the eNodeB 706 can comprise both a CSI reporting type 5a message and a CSI reporting type 2c message. The CSI reporting type 5a message can carry an RI and a CSI-RS indicator. The CSI-RS indicator can recommend a best CSI-RS resource based on a superior spectral efficiency. The CSI reporting type 2c message can carry a first PMI, a second PMI, and CQI for the best CSI-RS resource recommended by the CSI-RS indicator. The CSI reporting type 2c message can be consistent with the CSI reporting type 2c message discussed with respect to Section 7.2.2 of TS 36. 213 of the 3GPP LTE standards for any of Releases 10 through 11.

Alternatively, for examples where the CSI-RS report can be configured for eight antenna ports for a PUCCH of mode 1-1, the CSI-RS report 720 to the eNodeB 706 can comprise each of a CSI reporting type 3 message, a CSI reporting type 2e message, and a CSI reporting type 4 message. The CSI reporting type 3 message can carry an RI. The CSI reporting type 2e message can carry a CSI-RS indicator, a first PMI, and a second PMI for the best CSI-RS resource recommended by the CSI-RS indicator. The CSI reporting type 2e can be a new CSI reporting type, with a name consistent with the name conventions exemplified in Section 7.2.2 of TS 36. 213 of Release 11 of the 3GPP LTE standards. However, since the CSI reporting type 2e can be a new CSI reporting type, throughout this application, the name CSI reporting type 2e can be replaced with an alternative name as long as a CSI-RS indicator, a first PMI, and a second PMI for the best CSI-RS resource are still carried by the message. The CSI reporting type 4 message can carry a CQI. The CSI reporting type 4 message can be consistent with the CSI reporting type 4 message discussed with respect to Section 7.2.2 of TS 36.213 of the 3GPP LTE standards for any of Releases 8 through 11.

As an additional alternative (not depicted), for examples where the CSI-RS report can be configured for eight antenna ports for a PUCCH of mode 1-1, the CSI-RS report can comprise both a CSI reporting type 5 message and a CSI reporting type 2f message. The CSI reporting type 5 message can carry an RI and a first PMI. The CSI reporting type 5 message can be consistent with the CSI reporting type 5 message discussed with respect to Section 7.2.2 of TS 36. 213 of the 3GPP LTE standards for any of Releases 10 through 11. The CSI reporting type 2f message can carry a CSI-RS indicator, a second PMI for a best CSI-RS resource recommended by the CSI-RS indicator, and a CQI. The CSI reporting type 2f can be a new CSI reporting type, with a name consistent with the name conventions exemplified in Section 7.2.2 of TS 36. 213 of Release 11 of the 3GPP LTE standards. However, since the CSI reporting type 2f can be a new CSI reporting type, throughout this application, the name CSI reporting type 2f can be replaced with an alternative name as long as a CSI-RS indicator, a second PMI for a best CSI-RS resource recommended, and a CQI are still carried by the message.

As a further alternative (not depicted), the CSI-RS report can comprise a type 5a message and a CSI reporting type 2b message. The CSI reporting type 5a message can carry an RI, a first PMI, and a CSI-RS indicator. The CSI reporting type 2b message can carry a second PMI for a best CSI-RS resource recommended by the CSI-RS indicator and a CQI. The CSI reporting type 2b message can be consistent with the CSI reporting type 2b message discussed with respect to Section 7.2.2 of TS 36. 213 of the 3GPP LTE standards for any of Releases 10 through 11.

In some examples, in a third potential case 722, the CSI-RS report 722 can be configured with respect to multiple antenna ports that comprise two or four antenna ports for a PUCCH of mode 2-1. In such examples, the CSI-RS report can comprise each of a CSI reporting type 5a message, a CSI reporting type 2 message, and a CSI reporting type 1 message. The CSI reporting type 5a message can carry an RI and a CSI-RS indicator. The CSI-RS indicator can recommend a best CSI-RS resource based on a superior spectral efficiency. The CSI reporting type 2 message can carry a PMI and a WBCQI for the best CSI-RS resource recommended by the CSI-RS indicator. The CSI reporting type 1 message can carry a sub-band CQI. The CSI reporting type 1 message can be consistent with the CSI reporting type 1 message discussed with respect to Section 7.2.2 of TS 36. 213 of the 3GPP LTE standards for any of Releases 1 through 11.

As an additional alternative (not depicted), for examples where the CSI-RS report can be configured with respect to multiple antenna ports that comprise two or four antenna ports for a PUCCH of mode 2-1, the CSI-RS report can comprise each of a CSI reporting type 3 message, a CSI reporting type 2d message, and a CSI reporting type 1 message. The CSI reporting type 3 message can carry an RI. The CSI reporting type 2d message can carry a CSI-RS indicator, a PMI, and a WBCQI for a best CSI-RS resource recommended by the CSI-RS indicator. The CSI reporting type 1 message can carry a sub-band CQI.

In certain examples (not depicted), the CSI-RS report can be configured for eight antenna ports for a PUCCH of mode 2-1. In such examples, the CSI-RS report can comprise each of a CSI reporting type 2a message, a CSI reporting type 2b message, a CSI reporting type 1 message, and a CSI reporting type 6a message. The CSI reporting type 2a message can carry a first PMI. The CSI reporting type 2a message can be consistent with the CSI reporting type 2a message discussed with respect to Section 7.2.2 of TS 36. 213 of the 3GPP LTE standards for any of Releases 10 through 11. The CSI reporting type 2b message can carry a second PMI and a WBCQI. The CSI reporting type 1 message can carry a sub-band CQI. The CSI reporting type 6a message can carry an RI, a CSI-RS indicator, and a PTI. The CSI reporting type 6a can be a new CSI reporting type, with a name consistent with the name conventions exemplified in Section 7.2.2 of TS 36. 213 of Release 11 of the 3GPP LTE standards. However, since the CSI reporting type 6a can be a new CSI reporting type, throughout this application, the name CSI reporting type 6a can be replaced with an alternative name as long as an RI, a CSI-RS indicator, and a PTI are still carried by the message.

As an additional alternative (not depicted), for examples where the CSI-RS report can be configured for eight antenna ports for a PUCCH of mode 2-1, the CSI-RS report can comprise each of a CSI reporting type 2g message, a CSI reporting type 2b message, a CSI reporting type 1 message, and a CSI reporting type 6 message. The CSI reporting type 2g message can carry a first PMI and a CSI-RS indicator. The CSI reporting type 2g can be a new CSI reporting type, with a name consistent with the name conventions exemplified in Section 7.2.2 of TS 36. 213 of Release 11 of the 3GPP LTE standards. However, since the CSI reporting type 2g can be a new CSI reporting type, throughout this application, the name CSI reporting type 2g can be replaced with an alternative name as long as a first PMI and a CSI-RS indicator are still carried by the message. The CSI reporting type 2b message can carry a second PMI and a WBCQI. The CSI reporting type 1 message can carry a sub-band CQI. The CSI reporting type 6 message can carry an RI and a PTI. The CSI reporting type 6 message can be consistent with the CSI reporting type 6 message discussed with respect to Section 7.2.2 of TS 36. 213 of the 3GPP LTE standards for any of Releases 10 through 11.

As yet an additional alternative (not depicted), for examples where the CSI-RS report can be configured for eight antenna ports for a PUCCH of mode 2-1, the CSI-RS report can comprise each of a CSI reporting type 7 message, a CSI reporting type 6 message, a CSI reporting type 2a message, a CSI reporting type 2b message, and a CSI reporting type 1a message. The CSI reporting type 7 message can carry a CSI-RS indicator and have a periodicity that is one of equal to, or a multiple of, an RI periodicity to make use of a relatively slow variability with respect to vertical CSI to reduce overhead. The CSI reporting type 7 can be a new CSI reporting type, with a name consistent with the name conventions exemplified in Section 7.2.2 of TS 36. 213 of Release 11 of the 3GPP LTE standards. However, since the CSI reporting type 7 can be a new CSI reporting type, throughout this application, the name CSI reporting type 7 can be replaced with an alternative name as long as the message has the attributes described above. The CSI reporting type 6 message can carry an RI and a PTI for the recommended CSI-RS resource. The CSI reporting type 2a message can carry a first PMI. The CSI reporting type 2b message can carry a second PMI and a WBCQI. The CSI reporting type 1 message can carry a sub-band CQI.

In some examples (not depicted), the CSI-RS report can comprise each of a CSI reporting type 7 message, a CSI reporting type 3 message, and either a CSI reporting type 2 message and a CSI reporting type 2c message. The CSI reporting type 7 message can carry a CSI-RS indicator that can recommend a best CSI-RS resource based on a superior spectral efficiency and can have a periodicity that is equal to, or a multiple of, an RI periodicity to make use of a relatively slow variability with respect to vertical CSI to reduce overhead. The CSI reporting type 3 message can carry an RI for the best CSI-RS resource recommended by the CSI-RS indicator.

The CSI reporting type 2 message can carry a PMI and a CQI for the best CSI-RS resource recommended by the CSI-RS indicator and conditioned on the RI. In certain examples, the UE 706 can send the CSI reporting type 2 message where the CSI-RS report is configured with respect to multiple antenna ports that comprise one of two and four antenna ports for a PUCCH of mode 1-1. The CSI reporting type 2c message can carry a first PMI, a second PMI, and a CQI for the best CSI-RS resource recommended by the CSI-RS indicator and conditioned on the RI. In some examples, the reporting module can send the CSI reporting type 2c message where the CSI-RS report is configured for eight antenna ports for a PUCCH of mode 1-1.

FIG. 8A depicts Cyclic Delay Diversity and Rotation matrices for optimizing downlink data transmission in a multiple antenna environment that supports three layers of spatial multiplexing. To accommodate increased rank numbers associated with the increased spectral diversity made possible by an increased number of antenna elements at an eNodeB, UEs can be configured with more than two receive antennas. In such cases, it can be desirable to provide downlink transmissions, such as Physical Downlink Shared CHannel (PDSCH) transmissions in examples consistent with the 3GPP LTE standards, with more than two spatial multiplexing layers to increase diversity and/or throughput.

A codeword, corresponding to a unit of DL transmission data, such as a transport block, with error protection, can be applied to each spatial multiplexing layer. As a compromise between potential gains achievable by increasing a number of codewords and increasing amounts of overhead associated with increasing numbers of codewords, a wireless communication standard can set an upper limit to the number of available codewords. The 3GPP LTE standard limits the number of available codewords to two for a single transmission instance from an eNodeB. Therefore, codewords can be shared in scenarios that capitalize on advantages of rank numbers greater than 2, as is particularly likely to be the case in scenarios employing vertical beamforming.

Potential diversity for rank numbers greater than two can be harnessed by means of Cyclic Delay Diversity (CDD), a technique previously reserved for open loop communications that lack feedback. CDD can make use of a time delay, or phase shift in the frequency domain, that results in a linearly increasing phase shift with subcarrier frequency. The linearly increasing phase shift with increasing subcarrier frequency can be used to give each subcarrier a different beam pattern, increasing diversity. By delaying each antenna port corresponding to a different layer sharing a common codeword, each layer sharing the common codeword can benefit independently in the same way from CDD.

Additionally, power can be adjusted with respect to spatial multiplexing layers sharing a common codeword. Such an adjustment can be used to flatten the effective channel for the codeword in such a way to increase the accuracy that can be achieved for the single CQI provided for each codeword. Implementation of such CDD and power adjustments within a codeword divided among multiple layers can be achieved by matrix-vector multiplication at a transmitting eNodeB.

Equation 1 in FIG. 8A depicts an exemplary matrix-vector multiplication for an example with a rank number of 3. The two codewords can be mapped to the three layer according to Table 6.3.3.2-1 of Section 6.3.3.2 of TS 36.211 of Release 11 of the 3GPP LTE standards. According to Table 6.3.3.2-1 the first codeword can be mapped to the first layer, and the second codeword can be mapped to layers two and three.

With respect to Equation 1, a column vector, corresponding to vector x in Equation 1, can be generated at an eNodeB with symbols from each of the three layers, including multiple symbols from the common second codeword, corresponding to layers two and three, where the superscript on the elements in vector x indicate to which of the three layers the elements correspond. In Equation 1, i can be equal to an element in the series $0, 1, \ldots, M_{Symbol}^{Layer}-1$, to collect a symbol from each layer. The vector x can be multiplied by the rotational matrix U to adjust power, a CDD matrix D specific to a particular value of i to provide diversity within the common codeword, and a pre-coding matrix W, which can also be specific to a particular value of i.

Equation 2 depicts the CDD matrix D specific to a particular value of i. As can be appreciated, matrix D can be a diagonal matrix. Since the first two layers can have different codewords according to Table 6.3.3.2-1, the first non-zero elements in each of the first two columns can both have a value of 1, preserving the first and second elements of vector x. Since the second and the third layers, corresponding to the second and third elements in vector x, can share a common codeword according to Table 6.3.3.2-1, a phase shift, depending on the value of i, can be applied to the third element of the third column of D so that each layer can individually benefit from CDD.

Equation 3 depicts a rotation matrix U that can be used to adjust power. Since the first layer has a unique codeword, adjustments can be overlooked, and the first element of the first column of rotation matrix U can have a value of 1 to preserve the first element of vector x. Since the bottom four elements of rotation matrix U are non-zero, the second and third elements of vector x can be combined in the second and third layers, in keeping with the common codeword shared by these layers by the elements in the second and third rows of the second and third columns of matrix U. To flatten the effective cannel for the common codeword, each of these final four elements of rotation matrix U can be divided by the square root of two with respect to voltage gain, corresponding to dividing each of elements two and three in half with respect to power.

Equation 4 provides a simplified version of Equation 1, in which the product of vector x, matrix D, and matrix U are combined in a single vector r. In both Equation 1 and Equation 4, vector y corresponds to the output of the vector-matrix multiplication, as may be received by one or more UEs with appropriate considerations for channel and noise. The elements in vector r can correspond to one or more RSs. A similar approach can be taken with examples having a rank number greater than 3.

FIG. 8B depicts Cyclic Delay Diversity and Rotation matrices for optimizing downlink data transmission in a multiple antenna environment that supports more than three layers of spatial multiplexing. Again, Table 6.3.3.2-1 can be used to determine how the two codewords provided for in the 3GPP LTE standards can be divided between four to eight layers. In Equation 5, an expandable column vector, corresponding to vector x, is depicted.

The column vector x in Equation 5 can be expanded to provide an element for each layer. As with Equation 1, in Equation 5, the incremental variable i can equal an element in the series $0, 1, \ldots, M_{Symbol}^{Layer}-1$ to collect a symbol from each layer. Again, the vector x can be multiplied by the rotational matrix U to adjust power, a CDD matrix D specific to a particular value of i to provide diversity within the common codeword, and a pre-coding matrix W, which can also be specific to a particular value of i.

Equation 6 depicts an expandable CDD matrix D specific to a particular value of i. As before, a phase shift depending on the value of i and corresponding to a delay in the time domain, can be applied for each layer sharing a common codeword. Where a codeword has more than two layers, additional phase shifts, not shown, can be applied.

Equation 7 depicts an expandable rotation matrix U that can be used to adjust power. Each block of two layers can be assigned a corresponding sub-block in the matrix U. The size of such blocks can be increased, by increasing the number of non-zero columns and rows by one for each new layer according to the depicted pattern. Since the first layer has a unique codeword, adjustments can be overlooked, and the first element of the first column of rotation matrix U can have a value of 1 to preserve the first element of vector x. Since the bottom four elements of rotation matrix U are non-zero, the second and third elements of vector x can be combined in the second and third layers, in keeping with the common codeword shared by these layers. To flatten the effective cannel for the common codeword, each of these final four elements of rotation matrix U can be divided by the square root of two with respect to voltage gain, corresponding to dividing each element in half with respect to power.

Equation 8 provides a simplified version of Equation 1, in which the product of vector x, matrix D, and matrix U are combined in a single, expandable vector r. In both Equation 5 and Equation 8, vector y can again correspond to the output of the vector-matrix multiplication, as may be received by one or more UEs with appropriate considerations for channel and noise. The elements in vector r can correspond to one or more RSs. A similar approach can be taken with examples having a rank number greater than 3. The preceding approaches described with respect to FIG. 8A and FIG. 8B can be applied to both UE specific RSs and CRS based close loop beamforming and can be applied to all manner of beamforming configurations, including horizontal, vertical, and combinations thereof of beam configurations.

Figure 9:
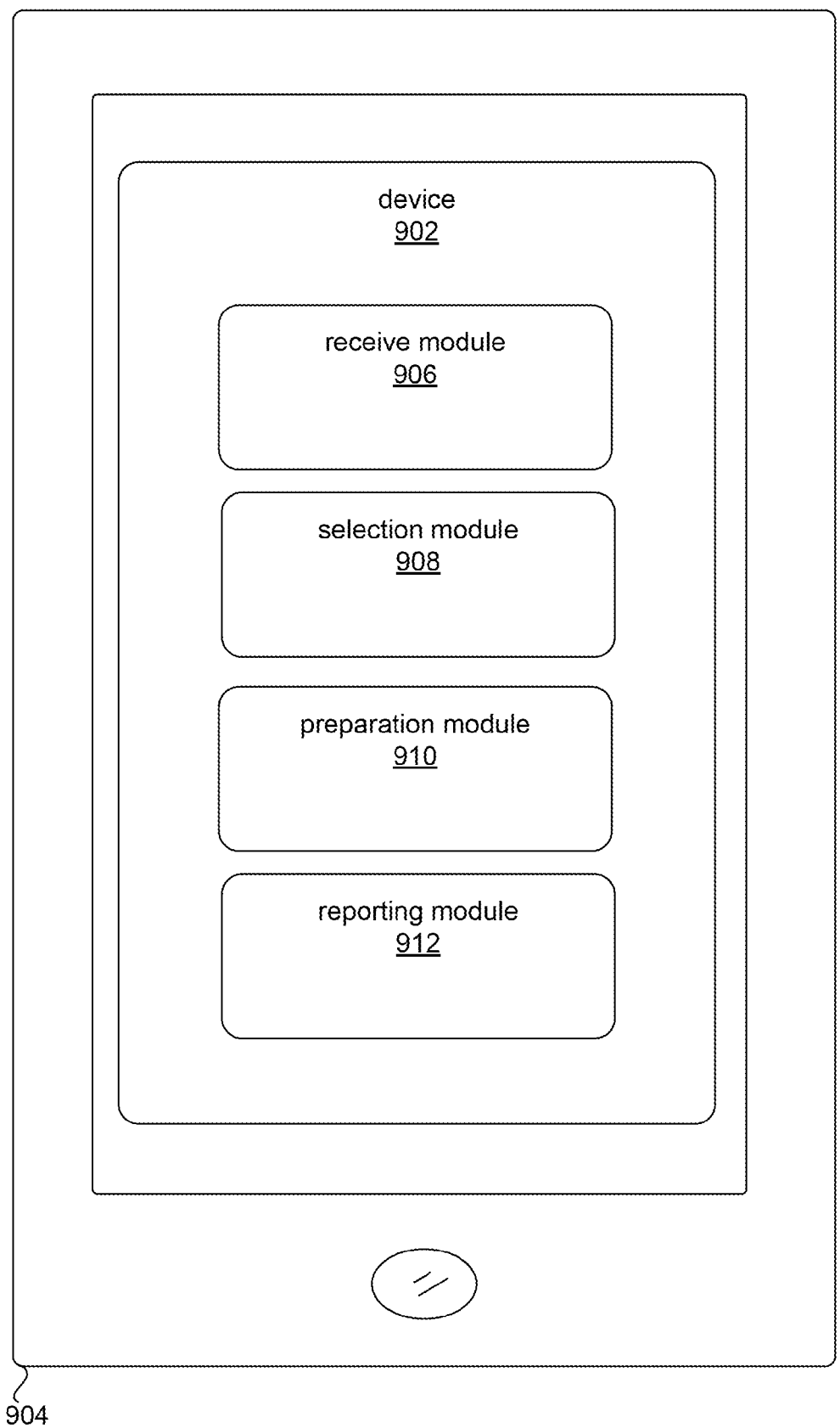
FIG. 9 is a block diagram illustrating a device, operating at a User Equipment (UE), for reducing feedback overhead associated with multiple vertical beams from a two-dimensional antenna array for wireless communication, consistent with various examples.

FIG. 9 depicts a device 900, residing at a UE 904, for reducing feedback overhead associated with multiple vertically configured beams from a two-dimensional antenna array for wireless communication. The device can comprise a receive module 906, a selection module 908, a preparation module 910, and a reporting module 912. The various modules can be communicatively coupled one to another.

The receive module 906 can be configured to receive multiple CSI-RS resources. A CSI-RS resource received by the receive module can correspond to one of multiple vertical beam configurations. In certain examples, the multiple vertical beam configurations can be configured for the same number of ports and can share a common codebook at the UE. In some examples, the multiple vertical beam configurations corresponding to the multiple CSI-RS resources received by the receive module can be transparent to the UE.

The selection module 908 can be configured to select a subset of the multiple vertical beam configurations for which to provide CSI-RS reports to reduce a number of CSI-RS reports, leaving a set of non-selected CSI-RS resources unreported. By selecting a subset of the multiple vertical beam configurations, the selection module can avoid CSI-RS reports for unselected vertical beam configurations, leaving a set of non-selected CSI-RS resources unreported. In some examples, the selection module can select the subset of the multiple vertical beam configurations based on a superior spectral efficiency.

The preparation module 910 can be configured to prepare one or more CSI-RS reports for the subset of multiple vertical beam configurations. The reporting module 912 can then send the one or more CSI-RS reports to an eNodeB. Several different approaches can be taken to preparing and reporting the CSI-RS report.

As with the CSI-RS report discussed with respect to the preceding figure, FIG. 7, for examples consistent with the 3GPP LTE standards, the unit of virtual channel response information can include various CSI message types. These various CSI message types can be tailored to a number of antenna ports and/or a PUCCH mode for which the unit of virtual channel response information is configured. All of the various scenarios for CSI message types that make up the CSI-RS report, which can be based on antenna port numbers and PUCCH modes, as discussed above, can also be applied to make up the unit of virtual channel response information, which can be sent as a series of such CSI message types.

Figure 10:
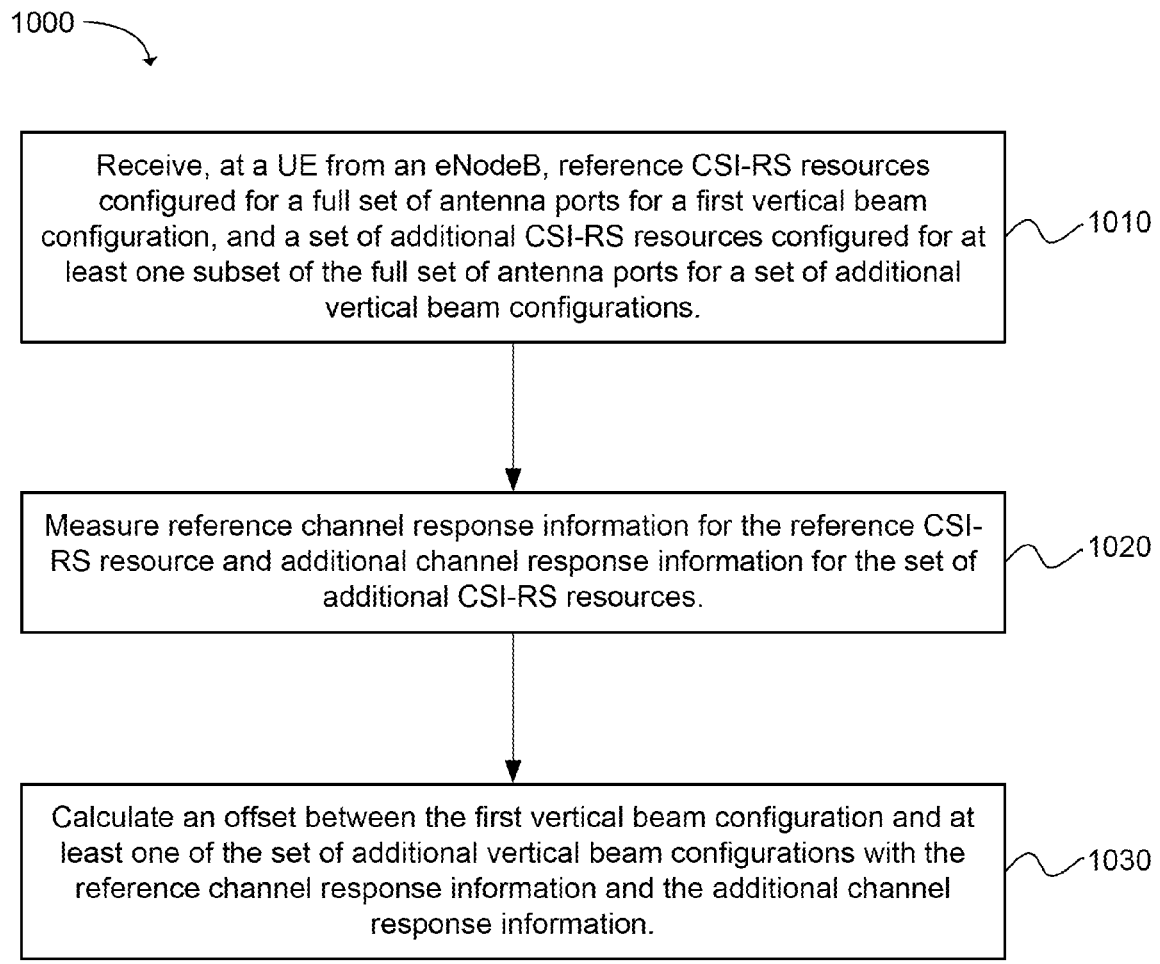
FIG. 10 is a flowchart depicting a process for reducing feedback overhead associated with multiple vertical beams from a two-dimensional antenna array for wireless communication, consistent with various examples.

FIG. 10 is a flowchart of a method 1000 for reducing feedback associated with multiple vertical beams from a two-dimensional antenna array for wireless communication. The method can, but need not necessarily, be embedded in a computer program product comprising a non-transitory computer usable medium. The computer readable medium can have a computer readable program code embodied therein.

The computer readable program code can be adapted to be executed to implement instructions for the method.

The method 1000 can comprise receiving 1010, at a UE from an eNodeB, CSI-RS resources. The CSI-RS resources can comprise reference CSI-RS resources configured for a full set of antenna ports for a first vertical beam configuration. The CSI-RS resources can also comprise a set of additional CSI-RS resources configured for at least one subset of the full set of antenna ports for a set of additional vertical beam configurations. The set of additional beam configurations can differ from the first vertical beam configuration.

Additionally, the method 1000 can comprise measuring 1020 reference channel response information for the reference CSI-RS resources for the first vertical beam configuration. Additional channel response information can also be measured 1020 for the set of additional CSI-RS resources for the set of additional vertical beam configurations. One or more offsets can be calculated 1030 between the first vertical beam configuration and one or more of the set of additional vertical beam configurations. The one or more offsets can be calculated with the reference channel response information and the additional channel response information.

In some examples of the method 1000, calculating 1030 the offset can further comprise calculating a difference between the reference channel response and the additional channel response information. In such examples, the reference channel response information can be for the reference CSI-RS resources configured for the full set of antenna ports. The additional channel response information can be for one of the set of additional CSI-RS resources configured for a subset of the full set of antenna ports. The offset can be measured in decibels (dBs).

Certain examples of the method 1000 can further comprise receiving vertical beamforming weights for the first vertical beam configuration. The vertical beamforming weights can be received over one of Layer 1 (L1), Layer 2 (L2), and Radio Resource Control (RRC) signaling in order to assist in vertical beam forming gain compensation. A second set of CSI-RS resources can also be received at a UE. The second set of CSI-RS resources can be in the set of additional CSI-RS resources that pertains to multiple antenna ports for multiple vertical antenna elements. The multiple vertical antenna elements can belong to a single horizontal CSI-RS port of the reference CSI-RS resources. Each vertical antenna element can treated as a different port.

Such examples can further comprise selecting a best vertical PMI for channel response information corresponding to the second set of CSI-RS resources from the additional channel response information. Additionally, such examples can comprise determining beamforming weights of the best vertical PMI for the second CSI-RS resource. Further, a cross correlation can be calculated between the vertical beamforming weights of the first vertical beam configuration and the beamforming weights of the best vertical PMI for the second set of CSI-RS resources. Another step can involve assigning the offset based on the cross correlation.

In certain examples, assigning the offset can further comprise assigning a value to the offset equal to the cross correlation between the vertical beamforming weights of the first vertical beam configuration and the beamforming weights of the best vertical PMI for the second set of CSI-RS resources. In such examples, a predetermined vertical beamforming gain value can be assigned where the cross correlation is 0. A non-limiting example of such a predetermined value, provided for purposes of illustration, can be 10 dB.

Some examples can further comprise calculating a unit of virtual channel response information. The unit of virtual channel response information can be for a selected vertical beam configuration of the set of additional vertical beam configurations. The unit of virtual information can be calculated by adding the offset to at least one unit of channel response information for at least one antenna port used by the selected vertical beam configuration. The at least one unit of channel response information can be measured with respect to the reference CSI-RS resources for the first vertical beam configuration on the at least one antenna port.

In such examples, the unit of virtual channel response information can comprise one or more CQIs, one or more PMIs, and/or one or more RIs. Additionally, such examples can further comprise reporting the unit of virtual channel response information to the eNodeB providing the reference CSI-RS resources and the set of additional CSI-RS resources. Several different approaches can be taken to preparing and reporting the unit of virtual channel response information.

As with the CSI-RS report discussed with respect to the preceding figure, FIG. 7, for examples consistent with the 3GPP LTE standards, the unit of virtual channel response information can include various CSI message types. These various CSI message types can be tailored to a number of antenna ports and/or a PUCCH mode for which the unit of virtual channel response information is configured. All of the various scenarios for CSI message types that make up the CSI-RS report, which can be based on antenna port numbers and PUCCH modes, as discussed above, can also be applied to make up the unit of virtual channel response information, which can be sent as a series of such CSI message types.

Figure 11:
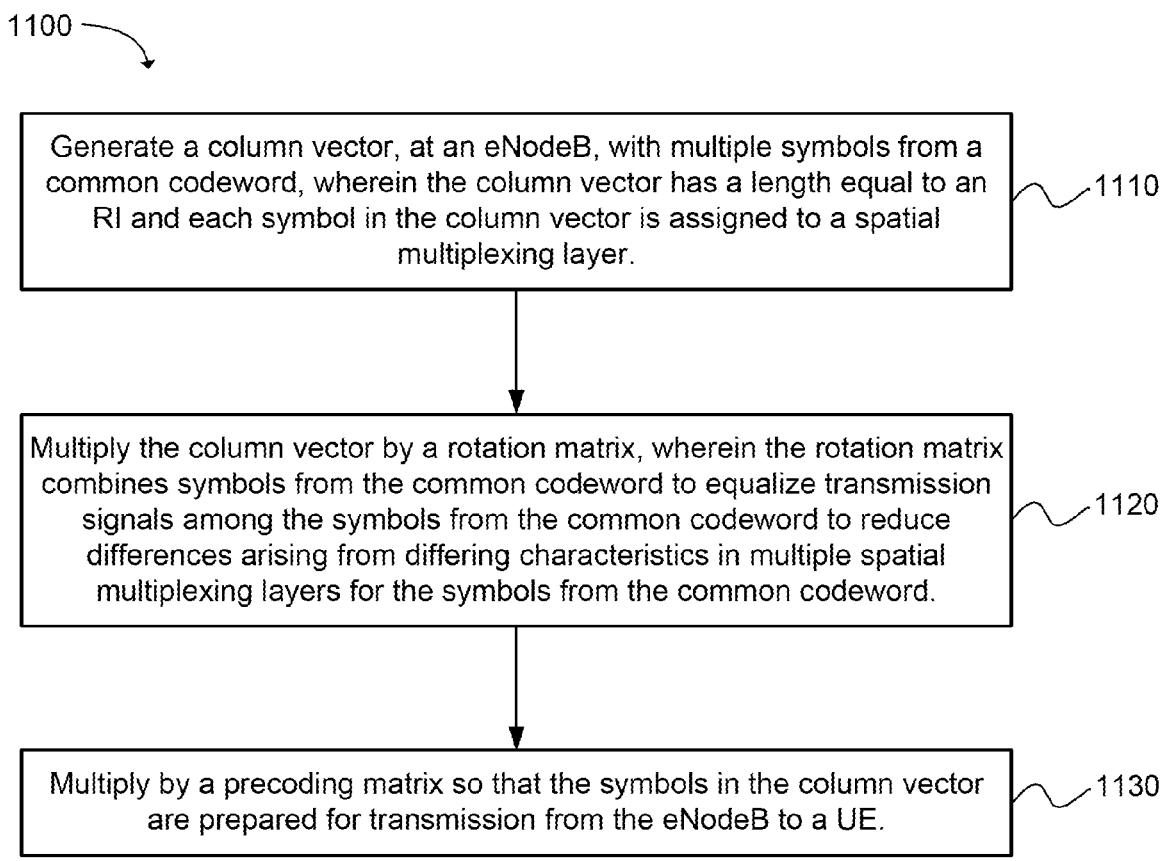
FIG. 11 is a flowchart depicting a process for introducing diversity to and reducing a power differential between multiple spatial multiplexing layers transmitting a common codeword, consistent with various examples; and, FIG. 12 is a block diagram of a UE in accordance with various examples.

FIG. 11 is a flowchart of a method 1100 for reducing a signal differential between multiple spatial multiplexing layers transmitting a common codeword. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method 1100 can comprise generating 1110 a column vector, at an evolved Node B (eNodeB), with multiple symbols from a common codeword. The column vector can have a length equal to an RI. Each symbol in the column vector can be assigned to a spatial multiplexing layer.

The column vector can be multiplied 1120 by a rotation matrix. The rotation matrix can combine symbols from the common codeword to equalize transmission signals among the symbols from the common codeword. The equalization can be performed to reduce differences arising from differing characteristics in multiple spatial multiplexing layers for the symbols from the common codeword.

In certain examples, the rotation matrix can combine symbols within the column vector from the common codeword while preventing a symbol from the column vector from a different codeword from being combined with a symbol from the common codeword. Also, in some examples, the rotation matrix can combine symbols within the column vector for each of two or more differing codewords while preventing symbols from differing codewords from being combined.

Additionally, the method 1100 can comprise multiplying 1130 by a precoding matrix so that the symbols in the column vector are prepared for transmission from the eNodeB to a User Equipment (UE). In some examples, vertical beam forming increases a number of spatial multiplexing layers transmitted from the eNodeB. In many examples, the RI can have a value greater than two.

Some examples can further comprise multiplying by a Cyclic Delay Diversity (CDD) matrix to provide spatial diversity to symbols in the column vector. Certain examples can further comprise including a Reference Signal (RS) in the common codeword. In such examples, the RS can be either a User-Equipment-specific RS (UERS) or a Cell-specific RS (CRS). The RS can enable a more accurate calculation of a CQI by a UE by reducing errors arising from differences in spatial multiplexing layers.

In certain examples, the CDD matrix can combine symbols within the column vector from the common codeword while preventing a symbol from the column vector from a different codeword from being combined with a symbol from the common codeword. Also, in some examples, the CDD matrix can combine symbols within the column vector for each of two or more differing codewords while preventing symbols from differing codewords from being combined.

Figure 12:
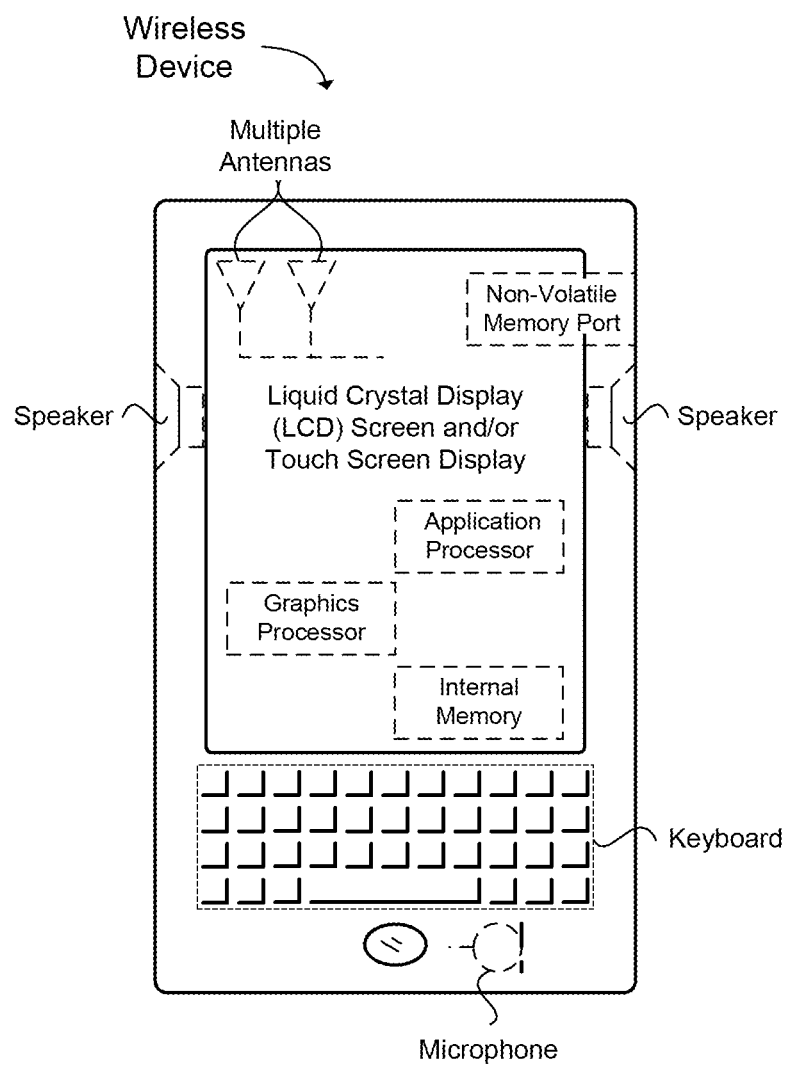

FIG. 12 provides an example illustration of a mobile device, such as UE, an MS, a mobile wireless mobile device, a mobile communication device, a tablet, a handset, or other type of mobile wireless mobile device. The mobile device can include one or more antennas configured to communicate with a BS, an eNodeB, or other type of WWAN transmission point. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a Wireless Local Area Network (WLAN), a Wireless Personal Area Network (WPAN), and/or a WWAN.

FIG. 12 also provides an illustration of a microphone and one or more speakers that can be used for audio input and output from the mobile device. The display screen may be a Liquid Crystal Display (LCD) screen, or other type of display screen such as an Organic Light Emitting Diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. Non-volatile memory can include a Solid State Drive (SSD), Flash Random Access Memory (RAM), and so forth. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, Solid State Drives (SSD), flash RAM, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A device for reducing feedback overhead associated with multiple vertical beams from a two-dimensional antenna array having a plurality of rows of antenna elements and a plurality of columns of antenna elements for wireless communication, comprising:
    a receive module, at a User Equipment (UE), configured to receive multiple Channel State Information-Reference Signal (CSI-RS) resources, wherein a CSI-RS resource corresponds to one of multiple vertical beam configurations associated with the plurality of columns of antenna elements; and
    a selection module, at the UE, configured to select a subset of multiple vertical beam configurations for which to provide CSI-RS reports to reduce a number of CSI-RS reports, leaving a set of non-selected CSI-RS resources unreported; and
    a preparation module, at the UE, configured to prepare at least one CSI-RS report for the subset of multiple vertical beam configurations; and
    a reporting module, at the UE, to send the at least one CSI-RS report to an evolved Node B (eNodeB), wherein the two-dimensional antenna array, including the plurality of rows of antenna elements and the plurality of columns of antenna elements, is located at the eNodeB.

2. The device of claim 1, wherein the selection module selects the subset of multiple vertical beam configurations based on a superior spectral efficiency.

3. The device of claim 1, wherein:
    the at least one CSI-RS report is configured with respect to multiple antenna ports that comprise one of two and four antenna ports for a Physical Uplink Control CHannel (PUCCH) of mode 1-1; and
    the reporting module reports the at least one CSI-RS report by sending, to the eNodeB, one of:
        both a CSI reporting type 5a message and a CSI reporting type 2 message, the CSI reporting type 5a message carrying a Rank Indicator (RI) and a CSI-RS indicator which recommends a best CSI-RS resource based on a superior spectral efficiency, the CSI reporting type 2 message carrying a Precoding Matrix Indicator (PMI) and a Channel Quality Indicator (CQI) for the best CSI-RS resource recommended by the CSI-RS indicator, and
        both a CSI reporting type 3 message and a CSI reporting type 2d message, the CSI reporting type 3 message carrying an RI, the CSI reporting type 2d message carrying a CSI-RS indicator, a PMI, and a CQI.

4. The device of claim 1, wherein:
    the at least one CSI-RS report is configured with respect to eight antenna ports for a Physical Uplink Control CHannel (PUCCH) of mode 1-1; and
    the reporting module reports the at least one CSI-RS report by sending, to the eNodeB, one of:
        both a CSI reporting type 5a message and a CSI reporting type 2c message, the CSI reporting type 5a message carrying a Rank Indicator (RI) and a CSI-RS indicator which recommends a best CSI-RS resource based on a superior spectral efficiency, the CSI reporting type 2c message carrying a first Precoding Matrix Indicator (PMI), a second PMI and a Channel Quality Indicator (CQI) for the best CSI-RS resource recommended by the CSI-RS indicator; and
        each of a CSI reporting type 3 message, a CSI reporting type 2e message, and a CSI reporting type 4 message, the CSI reporting type 3 message carrying an RI, the CSI reporting type 2e message carrying a CSI-RS indicator, a first PMI, and a second PMI for the best CSI-RS resource recommended by the CSI-RS indicator, and the CSI reporting type 4 message carrying a CQI.

5. The device of claim 1, wherein:
    the at least one CSI-RS report is configured with respect to eight antenna ports for a Physical Uplink Control CHannel (PUCCH) of mode 1-1; and
    the reporting module reports the at least one CSI-RS report by sending, to the eNodeB, one of:
        both a CSI reporting type 5 message and a CSI reporting type 2f message, the CSI reporting type 5 message carrying a Rank Indicator (RI) and a first Precoding Matrix Indicator (PMI), the CSI reporting type 2f message carrying a CSI-RS indicator, a second PMI for a best CSI-RS resource recommended by the CSI-RS indicator, and a CQI; and
        both a CSI reporting type 5a message and a CSI reporting type 2b message, the CSI reporting type 5a message carrying an RI, a first PMI, and a CSI-RS indicator, the CSI reporting type 2b message carrying a second PMI for a best CSI-RS resource recommended by the CSI-RS indicator and a CQI.

6. The device of claim 1, wherein:
    the at least one CSI-RS report is configured with respect to eight antenna ports for a Physical Uplink Control CHannel (PUCCH) of mode 1-1; and
    the reporting module reports the at least one CSI-RS report by sending, to the eNodeB, each of a CSI reporting type 7 message, a CSI reporting type 5 message, and a CSI reporting type 2b message, wherein:
        the CSI reporting type 7 message carries a CSI-RS indicator and has a periodicity that is one of equal to and a multiple of a Rank Indicator (RI) periodicity, making use of a relatively slow variability with respect to vertical CSI to reduce overhead,
        the CSI reporting type 5 message carries an RI and a first Precoding Matrix Indicator (PMI) for a best CSI-RS resource recommended by the CSI-RS indicator, and
        the CSI reporting type 2b message carries a second PMI and a Channel Quality Indicator (CQI) for the best CSI-RS resource recommended by the CSI-RS indicator and conditioned on the RI.

7. The device of claim 1, wherein:
    the at least one CSI-RS report is configured with respect to multiple antenna ports that comprise one of two and four antenna ports for a Physical Uplink Control CHannel (PUCCH) of mode 2-1; and the reporting module reports the at least one CSI-RS report by sending, to the eNodeB, one of:
- each of a CSI reporting type 5a message, a CSI reporting type 2 message, and a CSI reporting type 1 message, the CSI reporting type 5a message carrying a Rank Indicator (RI) and a CSI-RS indicator which recommends a best CSI-RS resource based on a superior spectral efficiency, the CSI reporting type 2 message carrying a Precoding Matrix Indicator (PMI) and a Wide Band Channel Quality Indicator (WBCQI) for the best CSI-RS resource recommended by the CSI-RS indicator, the CSI reporting type 1 message carrying a sub-band Channel Quality Indicator (CQI); and
- each of a CSI reporting type 3 message, a CSI reporting type 2d message, and a CSI reporting type 1 message, the CSI reporting type 3 message carrying a Rank Indicator (RI), the CSI reporting type 2d message carrying a CSI-RS indicator, a PMI, and a WBCQI for a best CSI-RS resource recommended by the CSI-RS indicator, the CSI reporting type 1 message carrying a sub-band CQI.

8. The device of claim 1, wherein:
the at least one CSI-RS report is configured with respect to eight antenna ports for a Physical Uplink Control CHannel (PUCCH) of mode 2-1; and
the reporting module reports the at least one CSI-RS report by sending, to the eNodeB, one of:
- each of a CSI reporting type 2a message, a CSI reporting type 2b message, a CSI reporting type 1 message, and a CSI reporting type 6a message, the CSI reporting type 2a message carrying a first Precoding Matrix Indicator (PMI), the CSI reporting type 2b message carrying a second PMI and a Wide Band Channel Quality Indicator (WBCQI), the CSI reporting type 1 message carrying a sub-band Channel Quality Indicator (CQI), and the CSI reporting type 6a message carrying a Rank Indicator (RI), a CSI-RS indicator and a Precoding Type Indicator (PTI), and
- each of a CSI reporting type 2g message, a CSI reporting type 2b message, a CSI reporting type 1 message, and a CSI reporting type 6 message, the CSI reporting type 2g message carrying a first PMI and a CSI-RS indicator, the CSI reporting type 2b message carrying a second PMI and a WBCQI, the CSI reporting type 1 message carrying a sub-band CQI, and the CSI reporting type 6 message carrying a Rank Indicator (RI) and a PTI.

9. The device of claim 1, wherein:
the at least one CSI-RS report is configured with respect to eight antenna ports for a Physical Uplink Control CHannel (PUCCH) of mode 2-1; and
the reporting module reports the at least one CSI-RS report by sending, to the eNodeB, each of a CSI reporting type 7 message, a CSI reporting type 6 message, a CSI reporting type 2a message, a CSI reporting type 2b message, and a CSI reporting type 1a message, wherein:
- the CSI reporting type 7 message carries a CSI-RS indicator and has a periodicity that is one of equal to and a multiple of a Rank Indicator (RI) periodicity, making use of a relatively slow variability with respect to vertical CSI to reduce overhead,
- the CSI reporting type 6 message carries an RI, and a Precoding Type Indicator (PTI) for the recommended CSI-RS resource,
- the CSI reporting type 2a message carries a first Precoding Matrix Indicator (PMI),
- the CSI reporting type 2b message carries a second PMI and a Wide Band Channel Quality Indicator (WBCQI), and
- the CSI reporting type 1 message carries a sub-band Channel Quality Indicator (CQI).

10. The device of claim 1, wherein the reporting module reports at least one CSI-RS report by sending, to the eNodeB, each of a CSI reporting type 7 message, a CSI reporting type 3 message, and one of a CSI reporting type 2 message and a CSI reporting type 2c message, wherein:
- the CSI reporting type 7 message carries a CSI-RS indicator that recommends a best CSI-RS resource based on a superior spectral efficiency and has a periodicity that is one of equal to and a multiple of a Rank Indicator (RI) periodicity, making use of a relatively slow variability with respect to vertical CSI to reduce overhead;
- the CSI reporting type 3 message carries an RI for the best CSI-RS resource recommended by the CSI-RS indicator;
- the CSI reporting type 2 message carries a Precoding Matrix Indicator (PMI) and a Channel Quality Indicator (CQI) for the best CSI-RS resource recommended by the CSI-RS indicator and conditioned on the RI; and
- the CSI reporting type 2c message carries a first Precoding Matrix Indicator (PMI), a second PMI, and a Channel Quality Indicator (CQI) for the best CSI-RS resource recommended by the CSI-RS indicator and conditioned on the RI.

11. The device of claim 1, wherein the multiple vertical beam configurations have the same number of ports and share a common codebook at the UE.

12. A method for reducing feedback overhead for multiple vertical beams from a two-dimensional antenna array having a plurality of rows of antenna elements and a plurality of columns of antenna elements for wireless communication, comprising:
- receiving, at a User Equipment (UE) from an evolved Node B (eNodeB):
  - reference Channel State Information-Reference Signal (CSI-RS) resources configured for a first full set of antenna ports for a first vertical beam configuration associated with the plurality of columns of antenna elements, and
  - a set of additional CSI-RS resources configured for at least one subset of a second full set of antenna ports for an additional vertical beam configuration associated with the plurality of columns of antenna elements, wherein the two-dimensional antenna array, including the plurality of rows of antenna elements and the plurality of columns of antenna elements, is located at the eNodeB;
- measuring reference channel response information for the reference CSI-RS resources and additional channel response information for the set of additional CSI-RS resources; and
- calculating an offset between the first vertical beam configuration and the additional vertical beam configuration with the reference channel response information and the additional channel response information.

13. The method of claim 12, wherein calculating the offset further comprises calculating a difference between the reference channel response information for the reference CSI-RS resources configured for the first full set of antenna ports and the additional channel response information for the set of additional CSI-RS resources configured for the subset of the second full set of antenna ports, where the offset is measured in decibels (dBs).

14. The method of claim 12, further comprising:
receiving vertical beamforming weights for the first vertical beam configuration over one of Layer 1 (L1), Layer 2 (L2), and Radio Resource Control (RRC) signaling in order to assist in vertical beamforming gain compensation;
selecting a best vertical Precoding Matrix Indicator (PMI) for the additional channel response information corresponding to the set of additional CSI-RS resources;
determining beamforming weights of the best vertical PMI;
calculating a cross correlation between the vertical beamforming weights and the beamforming weights of the best vertical PMI, and
assigning the offset based on the cross correlation.

15. The method of claim 14, wherein assigning the offset further comprises assigning a value to the offset equal to the cross correlation between the vertical beamforming weights of the first vertical beam configuration and the beamforming weights of the best vertical PMI for the second set of CSI-RS resources, wherein a cross correlation of 0 results in assigning a predetermined vertical beamforming gain value.

16. The method of claim 12, further comprising calculating a unit of virtual channel response information for the additional vertical beam configuration by adding the offset to at least one unit of channel response information measured with respect to the reference CSI-RS resources for the first vertical beam configuration for at least one antenna port.

17. The method of claim 16, further comprising reporting the unit of virtual channel response information to the eNodeB.

18. The method of claim 17, wherein:
the unit of virtual channel response information is configured with respect to multiple antenna ports that comprise one of two and four antenna ports for a Physical Uplink Control CHannel (PUCCH) of mode 1-1; and
reporting the unit of virtual channel response information comprises sending one of:
both a CSI reporting type 5a message and a CSI reporting type 2 message, the CSI reporting type 5a message carrying a Rank Indicator (RI) and a CSI-RS indicator which recommends a best CSI-RS resource based on a superior spectral efficiency, the CSI reporting type 2 message carrying a Precoding Matrix Indicator (PMI) and a Channel Quality Indicator (CQI) for the best CSI-RS resource recommended by the CSI-RS indicator, and
both a CSI reporting type 3 message and a CSI reporting type 2d message, the CSI reporting type 3 message carrying an RI, the CSI reporting type 2d message carrying a CSI-RS indicator, a PMI, and a CQI.

19. The method of claim 17, wherein:
the unit of virtual channel response information is configured with respect to eight antenna ports for a Physical Uplink Control CHannel (PUCCH) of mode 1-1; and
reporting the unit of virtual channel response information comprises sending each of a CSI reporting type 7 message, a CSI reporting type 5 message, and a CSI reporting type 2b message, wherein:
the CSI reporting type 7 message carries a CSI-RS indicator and has a periodicity that is one of equal to and a multiple of a Rank Indicator (RI) periodicity, making use of a relatively slow variability with respect to vertical CSI to reduce overhead,
the CSI reporting type 5 message carries an RI and a first Precoding Matrix Indicator (PMI) for a best CSI-RS resource recommended by the CSI-RS indicator, and
the CSI reporting type 2b message carries a second PMI and a Channel Quality Indicator (CQI) for the best CSI-RS resource recommended by the CSI-RS indicator and conditioned on the RI.

20. The method of claim 17, wherein:
the unit of virtual channel response information is configured with respect to multiple antenna ports that comprise one of two and four antenna ports for a Physical Uplink Control CHannel (PUCCH) of mode 2-1; and
reporting the unit of virtual channel response information comprises sending one of:
each of a CSI reporting type 5a message, a CSI reporting type 2 message, and a CSI reporting type 1 message, the CSI reporting type 5a message carrying a Rank Indicator (RI) and a CSI-RS indicator which recommends a best CSI-RS resource based on a superior spectral efficiency, the CSI reporting type 2 message carrying a Precoding Matrix Indicator (PMI) and a Wide Band Channel Quality Indicator (WBCQI) for the best CSI-RS resource recommended by the CSI-RS indicator, the CSI reporting type 1 message carrying a sub-band Channel Quality Indicator (CQI); and
each of a CSI reporting type 3 message, a CSI reporting type 2d message, and a CSI reporting type 1 message, the CSI reporting type 3 message carrying a Rank Indicator (RI), the CSI reporting type 2d message carrying a CSI-RS indicator, a PMI, and a WBCQI for a best CSI-RS resource recommended by the CSI-RS indicator, the CSI reporting type 1 message carrying a sub-band CQI.

21. The method of claim 17, wherein:
the unit of virtual channel response information is configured with respect to eight antenna ports for a Physical Uplink Control CHannel (PUCCH) of mode 2-1; and
reporting the unit of virtual channel response information comprises sending one of:
each of a CSI reporting type 2a message, a CSI reporting type 2b message, a CSI reporting type 1 message, and a CSI reporting type 6a message, the CSI reporting type 2a message carrying a first Precoding Matrix Indicator (PMI), the CSI reporting type 2b message carrying a second PMI and a Wide Band Channel Quality Indicator (WBCQI), the CSI reporting type 1 message carrying a sub-band Channel Quality Indicator (CQI), and the CSI reporting type 6a message carrying a Rank Indicator (RI), a CSI-RS indicator and a Precoding Type Indicator (PTI), and
each of a CSI reporting type 2g message, a CSI reporting type 2b message, a CSI reporting type 1 message, and a CSI reporting type 6 message, the CSI reporting type 2g message carrying a first PMI and a CSI-RS indicator, the CSI reporting type 2b message carrying a second PMI and a WBCQI, the CSI reporting type 1 message carrying a sub-band CQI, and the CSI reporting type 6 message carrying a Rank Indicator (RI) and a PTI.

22. The method of claim 17, wherein:
the unit of virtual channel response information is configured with respect to eight antenna ports for a Physical Uplink Control CHannel (PUCCH) of mode 2-1; and
reporting the unit of virtual channel response information comprises sending each of a CSI reporting type 7 message, a CSI reporting type 6 message, a CSI reporting type 2a message, a CSI reporting type 2b message, and a CSI reporting type 1a message, wherein:

the CSI reporting type 7 message carries a CSI-RS indicator and that has a periodicity that is one of equal to and a multiple of a Rank Indicator (RI) periodicity, making use of a relatively slow variability with respect to vertical CSI to reduce overhead, the CSI reporting type 6 message carries an RI, and a Precoding Type Indicator (PTI) for the recommended CSI-RS resource, the CSI reporting type 2a message carries a first Precoding Matrix Indicator (PMI), the CSI reporting type 2b message carries a second PMI and a Wide Band Channel Quality Indicator (WB-CQI), and the CSI reporting type 1 message carries a sub-band Channel Quality Indicator (CQI).

23. The method of claim 17, wherein reporting the unit of virtual channel response information comprises sending each of a CSI reporting type 7 message, a CSI reporting type 3 message, and one of a CSI reporting type 2 message and a CSI reporting type 2c message, wherein:

the CSI reporting type 7 message carries a CSI-RS indicator that recommends a best CSI-RS resource based on a superior spectral efficiency and has a periodicity that is one of equal to and a multiple of a Rank Indicator (RI) periodicity, making use of a relatively slow variability with respect to vertical CSI to reduce overhead;

the CSI reporting type 3 message carries an RI for the best CSI-RS resource recommended by the CSI-RS indicator;

the CSI reporting type 2 message carries a Precoding Matrix Indicator (PMI) and a Channel Quality Indicator (CQI) for the best CSI-RS resource recommended by the CSI-RS indicator and conditioned on the RI; and the CSI reporting type 2c message carries a first Precoding Matrix Indicator (PMI), a second PMI, and a Channel Quality Indicator (CQI) for the best CSI-RS resource recommended by the CSI-RS indicator and conditioned on the RI.

24. A computer program product comprising at least one non-transitory computer usable medium having a computer readable program code embodied therein to implement instructions for a method for reducing a power differential between multiple spatial multiplexing layers transmitting a common codeword, comprising:

generating a column vector, at an evolved Node B (eNodeB), with multiple symbols from a common codeword, wherein the column vector has a length equal to a Rank Indicator (RI) and each symbol in the column vector is assigned to a spatial multiplexing layer, wherein vertical beam forming increases a number of spatial multiplexing layers transmitted from the eNodeB and the vertical beamforming is performed using an antenna array having a plurality of rows of antenna elements and a plurality of columns of antenna elements, wherein the two-dimensional antenna array, including the plurality of rows of antenna elements and the plurality of columns of antenna elements, is located at the eNodeB;

multiplying the column vector by a rotation matrix, wherein the rotation matrix combines symbols from the common codeword to equalize transmission signals among the symbols from the common codeword to reduce differences arising from differing characteristics in multiple spatial multiplexing layers for the symbols from the common codeword; and multiplying by a precoding matrix so that the symbols in the column vector are prepared for transmission from the eNodeB to a User Equipment (UE).

25. The computer program product of claim 24 further comprising multiplying by a Cyclic Delay Diversity (CDD) matrix to provide spatial diversity to symbols in the column vector.

26. The computer program product of claim 25, wherein the CDD matrix combines symbols within the column vector from the common codeword while preventing a symbol from the column vector from a different codeword from being combined with a symbol from the common codeword.

27. The computer program product of claim 24, wherein the rotation matrix combines symbols within the column vector for each of at least two differing codewords while preventing symbols from differing codewords from being combined.

28. The computer program product of claim 24, further comprising including a Reference Signal (RS) in the common codeword.

29. The computer program product of claim 28, wherein the RS is one of a User-Equipment-specific RS (UERS) and a Cell-specific RS (CRS), enabling a more accurate calculation of a Channel Quality Indicator (CQI) by a User Equipment (UE) by reducing errors arising from differences in spatial multiplexing layers.

* * * * *